US008218188B2

(12) United States Patent
Matsui et al.

(10) Patent No.: US 8,218,188 B2
(45) Date of Patent: Jul. 10, 2012

(54) ELECTRONIC DOCUMENT STORAGE APPARATUS, ELECTRONIC DOCUMENT STORAGE AND REFERENCE SYSTEM, ELECTRONIC DOCUMENT TRANSFER METHOD, AND COMPUTER READABLE MEDIUM FOR STORING AN ELECTRONIC DOCUMENT

(75) Inventors: Takayuki Matsui, Tokyo (JP); Keizou Satoh, Tokyo (JP); Yoshiaki Miyoshi, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1807 days.

(21) Appl. No.: 11/153,418

(22) Filed: Jun. 16, 2005

(65) Prior Publication Data
US 2006/0066902 A1 Mar. 30, 2006

(30) Foreign Application Priority Data
Sep. 29, 2004 (JP) .................................. 2004-284566

(51) Int. Cl.
*G06K 15/00* (2006.01)
(52) U.S. Cl. ............... 358/1.16; 358/1.15; 707/999.204; 707/E17.01; 705/51
(58) Field of Classification Search ........................ None
See application file for complete search history.

(56) References Cited

U.S. PATENT DOCUMENTS

| | | | | |
|---|---|---|---|---|
| 5,552,901 A | * | 9/1996 | Kikuchi et al. ............... | 358/468 |
| 6,072,599 A | * | 6/2000 | Oba et al. ..................... | 358/444 |
| 6,795,834 B2 | | 9/2004 | Higashiura et al. | |
| 6,862,583 B1 | * | 3/2005 | Mazzagatte et al. ........... | 705/64 |
| 2002/0002561 A1 | * | 1/2002 | Higashiura et al. ........... | 707/204 |
| 2003/0081790 A1 | * | 5/2003 | Kallahalla et al. ............. | 380/281 |
| 2003/0217008 A1 | * | 11/2003 | Habegger et al. ............... | 705/51 |
| 2004/0064703 A1 | * | 4/2004 | Makita ........................... | 713/176 |
| 2005/0065857 A1 | * | 3/2005 | Sakai et al. ..................... | 705/26 |
| 2005/0240636 A1 | * | 10/2005 | Shitomi et al. ................. | 707/204 |

FOREIGN PATENT DOCUMENTS

| | | |
|---|---|---|
| CA | 2256934 | 6/2000 |
| DE | 199 60 977 A1 | 7/2000 |
| DE | 101 46 977 A1 | 4/2003 |
| JP | 10-20779 | 1/1998 |
| JP | 2000-261584 | 9/2000 |
| JP | 2001-27960 | 1/2001 |
| JP | 2001-175516 | 6/2001 |
| JP | 2001-175659 | 6/2001 |
| JP | 2002-82821 | 3/2002 |

OTHER PUBLICATIONS

Japanese Office Action issued Jan. 26, 2010 in corresponding Japanese Patent Application 2004-284566.
German Office Action issued Sep. 17, 2010 in corresponding German Patent Application 10 2005 016 938.4-53.

* cited by examiner

*Primary Examiner* — Vincent Rudolph
(74) *Attorney, Agent, or Firm* — Staas & Halsey LLP

(57) ABSTRACT

An electronic document storage and reference system, for providing an electronic document storage apparatus for performing a document transfer processing effectively, and providing means for restoring and enabling the transferred electronic document for a reference on an apparatus other than the electronic document storage apparatus, comprises a unit for transferring from the electronic document storage apparatus to an archive media an electronic document stored for more than a specified period of time, a unit for emigrating, from the electronic document storage apparatus, the information required for referring to the electronic document transferred to the archive media and a unit for restoring the transferred electronic document from the archive media for enabling the electronic document to be referred to.

11 Claims, 29 Drawing Sheets

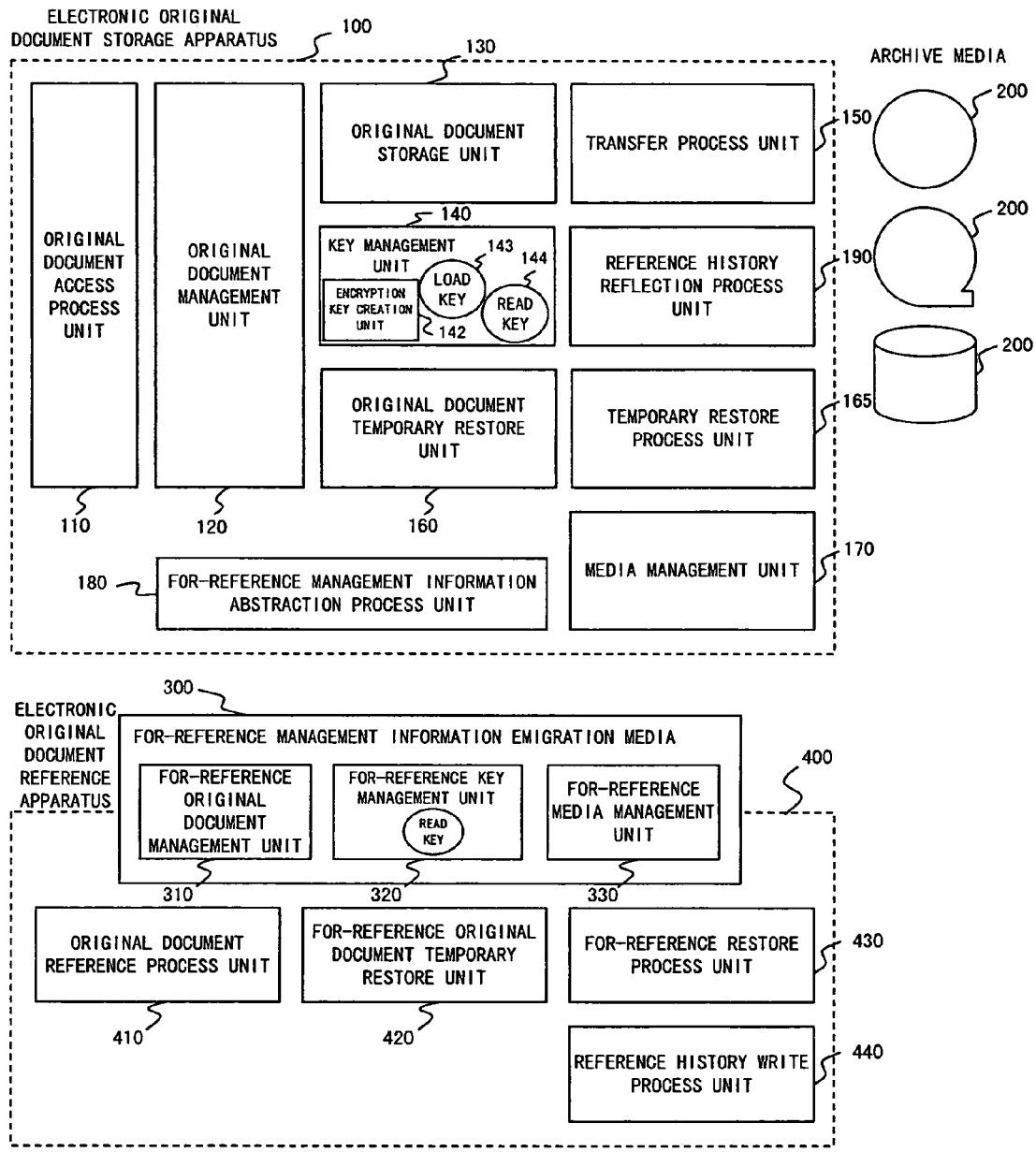
F I G. 1

ORIGINAL DOCUMENT MANAGEMENT UNIT 120

ORIGINAL DOCUMENT MANAGEMENT TABLE 121

| DOCUMENT ID | VERSION NUMBER | OPERATION DATE | STATUS | MEDIA ID |
|---|---|---|---|---|
|  |  |  |  |  |
| 1111 | 1 | 031201 | STORED |  |
|  |  |  |  |  |
|  |  |  |  |  |
| 2222 | 1 | 010103 | TRANSFERRED | AAAA |
|  |  |  |  |  |
|  |  |  |  |  |
| 3333 | 1 | 001124 | RESTORED | BBBB |
|  |  |  |  |  |
|  |  |  |  |  |
|  |  |  |  |  |
|  |  |  |  |  |

ORIGINAL DOCUMENT ACCESS HISTORY TABLE 122

| LOG IX | DOCUMENT ID | VERSION NUMBER | OPERATION DATE | OPERATION | USER ID |
|---|---|---|---|---|---|
|  |  |  |  |  |  |
| nnnn | 1111 | 1 | 40328 | REFERENCE | USER AA |
|  |  |  |  |  |  |

FIG. 2A

ORIGINAL DOCUMENT STORAGE UNIT 130

ORIGINAL DOCUMENT TABLE 131

| DOCUMENT ID | VERSION NUMBER | OPERATION DATE | ORIGINAL DOCUMENT DATA |
|---|---|---|---|
|  |  |  |  |
| 1111 | 1 | 031201 | ORIGINAL DOCUMENT AAAA |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |

F I G. 2 B

KEY MANAGEMENT UNIT 140

FOR-MANAGEMENT KEY TABLE 141

| KEY ID | LOAD KEY | READ KEY |
|--------|----------|----------|
|        |          |          |
| kkkk   | LOAD KEY 1 | READ KEY 1 |
|        |          |          |
|        |          |          |

FIG. 2C

ORIGINAL DOCUMENT TEMPORARY RESTORE UNIT 160

FOR-REFERENCE ORIGINAL DOCUMENT TABLE 161

| DOCUMENT ID | VERSION NUMBER | OPERATION DATE | ORIGINAL DOCUMENT DATA |
|---|---|---|---|
|  |  |  |  |
|  |  |  |  |
|  |  |  |  |
| 3333 | 1 | 001124 | ORIGINAL DOCUMENT CCCC |
|  |  |  |  |
|  |  |  |  |
|  |  |  |  |
|  |  |  |  |

FIG. 2D

MEDIA MANAGEMENT UNIT 170

MEDIA MANAGEMENT TABLE 171

| MEDIA ID | MEDIA NAME | OPERATION TIME PERIOD | KEY ID | HASH VALUE | STATUS |
|---|---|---|---|---|---|
| | | | | | |
| AAAA | EJECTED 200101 | 0101~0103 | kkkk | HASH AA | TRANSFERRED |
| BBBB | EJECTED 200011 | 0011~0012 | kkkkl | HASH BB | TRANSFERRED |
| | | | | | |

FIG. 2E

FOR-REFERENCE ORIGINAL DOCUMENT TEMPORARY RESTORE UNIT 420

FOR-REFERENCE ORIGINAL DOCUMENT TABLE 421

| DOCUMENT ID | VERSION NUMBER | OPERATION DATE | ORIGINAL DOCUMENT DATA |
|---|---|---|---|
| | | | |
| | | | |
| | | | |
| | | | |

F I G. 4

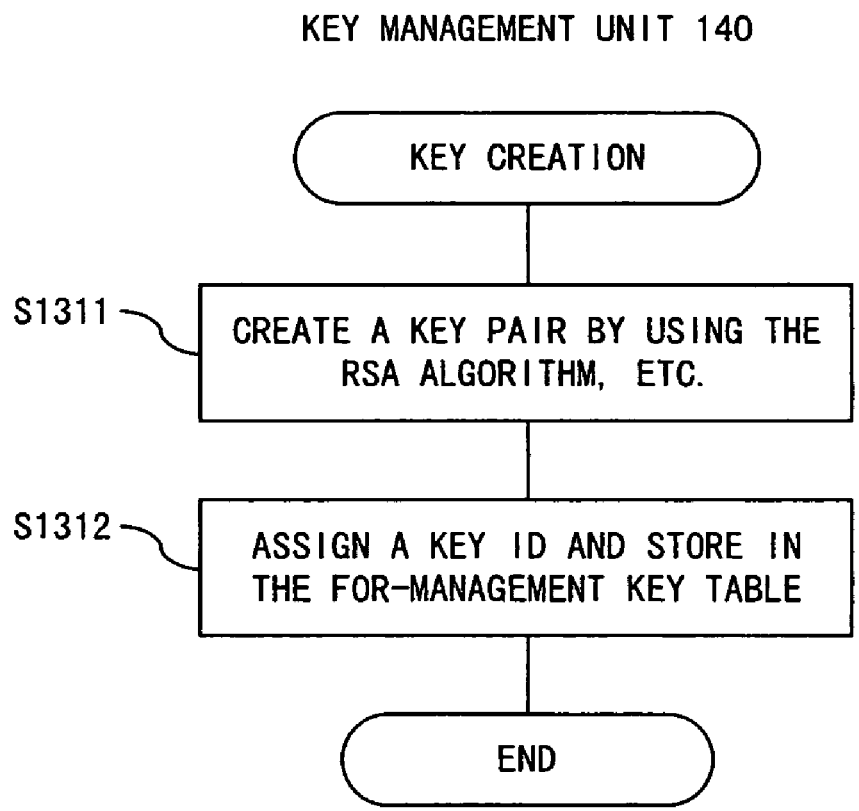
F I G. 1 3 A

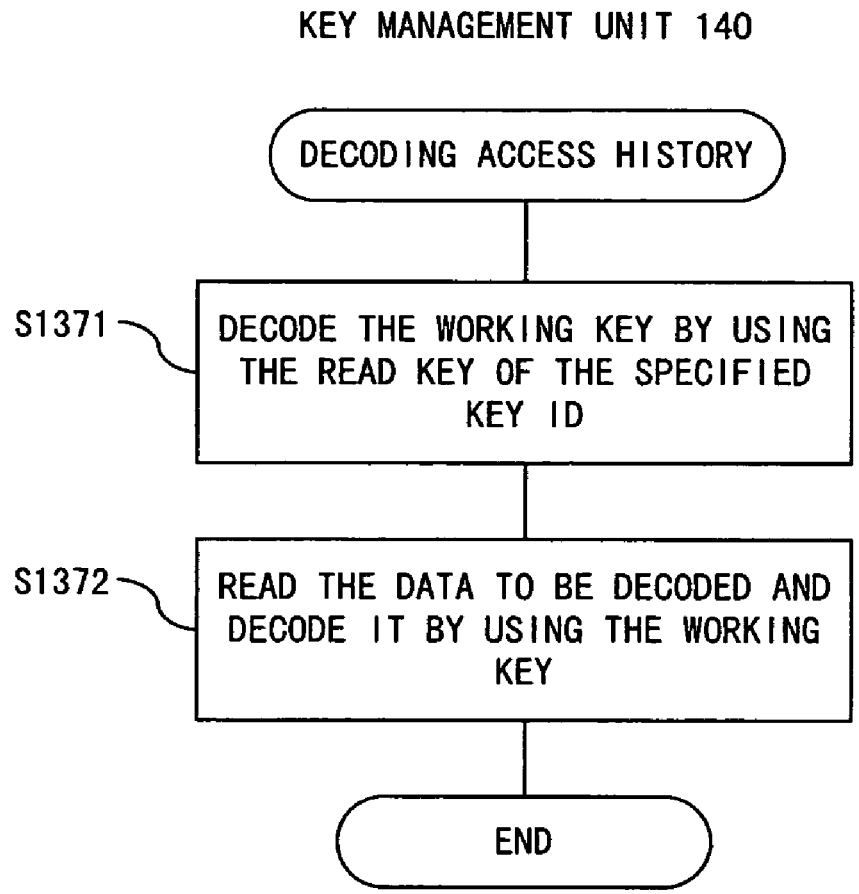
F I G. 1 3 G

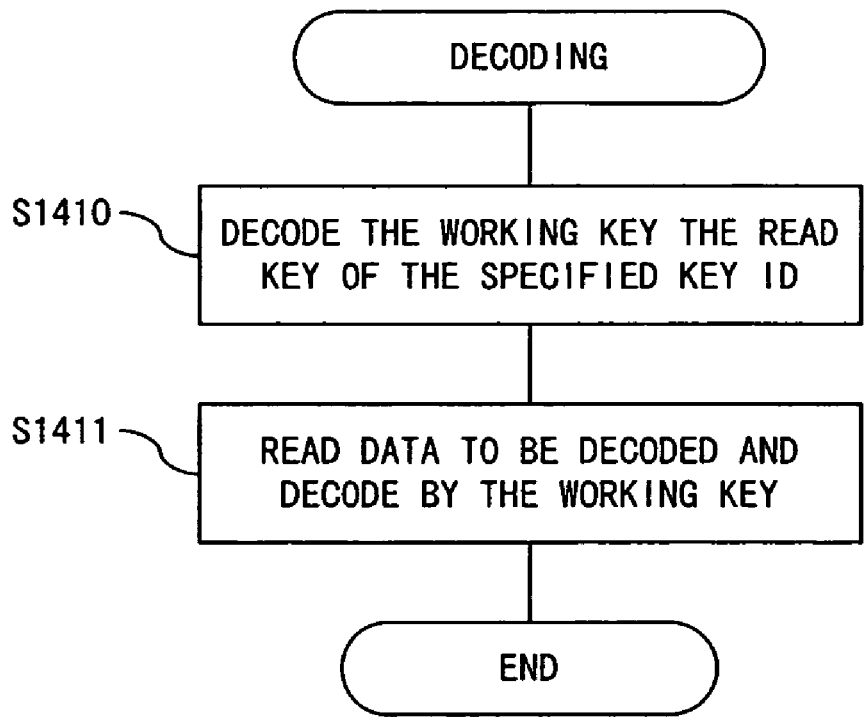
F I G. 1 4 A

FOR-REFERENCE KEY MANAGEMENT UNIT 320

ELECTRONIC DOCUMENT STORAGE APPARATUS, ELECTRONIC DOCUMENT STORAGE AND REFERENCE SYSTEM, ELECTRONIC DOCUMENT TRANSFER METHOD, AND COMPUTER READABLE MEDIUM FOR STORING AN ELECTRONIC DOCUMENT

BACKGROUND OF THE INVENTION

1. Field of the Invention

The present invention relates to an apparatus for storing a large number of electronic documents required for a strict management for access control, and typically to an electronic original document storage apparatus and the related apparatuses for storing a large number of original electronic documents required for assuring the originality thereof in low cost and safety.

2. Description of the Related Art

With a recent development of information processing apparatuses, management of documents have been in transition from the conventional paper basis to the electronic data basis. Meanwhile, with a development of the legal system, a possibility of filing a large number of taxation documents in electronic data is beginning to become an actuality. Copying or tampering with such documents in the form of electronic data is easy on an information processing apparatus, hence making lost sight of the original of those documents a real possibility. As a countermeasure to such a problem, an information processing apparatus for managing the originals of electronic documents, namely an electronic vault capable of a strict management for access control, is commercialized as noted in a patent document below.

And in the apparatus for distinguishing between the original and a copy, that is, in the electronic vault, an originality of document is achieved by comprising the following functions of:

(1) distinguishing between the original and a copy, and making the original unique in which the uniqueness of originality is kept if the original is moved to another electronic vault;

(2) detecting a tampering of the original;

(3) recording a fact of handling the original and detecting a tampering of the original handling record as well, where the handling means all the handling such as registration, reference, modification move, duplication (i.e., copy), making a backup, transfer to another media, restore, et cetera. Also storing every document of generations modified; and (4) controlling access rights to the original.

Since the electronic vault, however, basically records files (e.g., electronic documents) in a RAID (Redundant Array of Independent Disks) apparatus, a total volume of stored files becomes large, necessitating to equip an additional disk, or transfer some files to an external storage medium, before the RAID apparatus becomes overcapacitated and requiring cumbersome work for selecting data to be transferred piece by piece as the amount of data under management becomes very large.

Furthermore, it has been cumbersome to restore the transferred electronic document back to the electronic vault itself in order to refer to the electronic document.

[Patent document 1] Japanese Published patent application 2002-82821.

SUMMARY OF THE INVENTION

Therefore, the challenge of the present invention is to improve an efficiency of the work for transferring an electronic document, such as an electronic original document requiring a strict access control, from the storing electronic document storage apparatus to external media (i.e., archive media) while keeping the security, and make it possible not only to restore back to the transferring electronic document storage apparatus for referring but also to refer to the transferred document on an apparatus other than the aforementioned transferring storage apparatus, when referring to the transferred electronic document.

An electronic document storage apparatus according to the present invention comprises an electronic document storage unit for storing a registered electronic document for a specified period of time, an electronic document management unit for storing at least a status, a registration date and an access history of the registered documents and an transfer process unit for transferring an electronic document registered prior to a specified date from among the electronic documents stored in the electronic document storage unit by referring to information stored in the electronic document management unit.

Meanwhile, an electronic document reference apparatus according to the present invention, which is an electronic document reference apparatus for referring to a document being transferred from a document storage apparatus for storing the electronic documents to an archive media, comprises an electronic document reference process unit for accessing to the archive media based on for-reference management information provided by the electronic document storage apparatus and a for-reference restore process unit for reading out the electronic document from the archive media to a for-reference electronic document temporary restore unit.

According to the present invention, it is possible to transfer an electronic document registered prior to a specified date automatically to an archive medium, thereby improving an efficiency of the work for transferring thereto.

It is also possible to read out the document transferred to an archive medium by an electronic document reference apparatus for receiving for-reference management data of the archive media from the electronic document storage apparatus.

BRIEF DESCRIPTION OF THE DRAWINGS

FIG. 1 describes the principle of the present invention and constituting elements for use in an embodiment according to the present invention;

FIG. 2A describes configurations of an original document management table and an original document access history table both comprised by an original document management unit of an electronic original document storage apparatus;

FIG. 2B describes a configuration of original document table comprised by an original document management unit of the electronic original document storage apparatus;

FIG. 2C describes a configuration of for-management key table comprised by a key management unit of the electronic original document storage apparatus;

FIG. 2D describes a configuration of for-reference original document table comprised by an original document temporary restore unit of the electronic original document storage apparatus;

FIG. 2E describes a configuration of media management table comprised by a media management unit of the electronic original document storage apparatus;

FIG. 4 describes a configuration of for-reference original document table comprised by a for-reference original document temporary restore unit of an electronic original document reference apparatus;

FIG. 13A describes a creation of key in a key management unit;

FIG. 13G describes a decoding of a reference history in the key management unit;

FIG. 14A describes a decoding by read key in a for-reference key management unit;

DESCRIPTION OF THE PREFERRED EMBODIMENTS

Figure 2F:
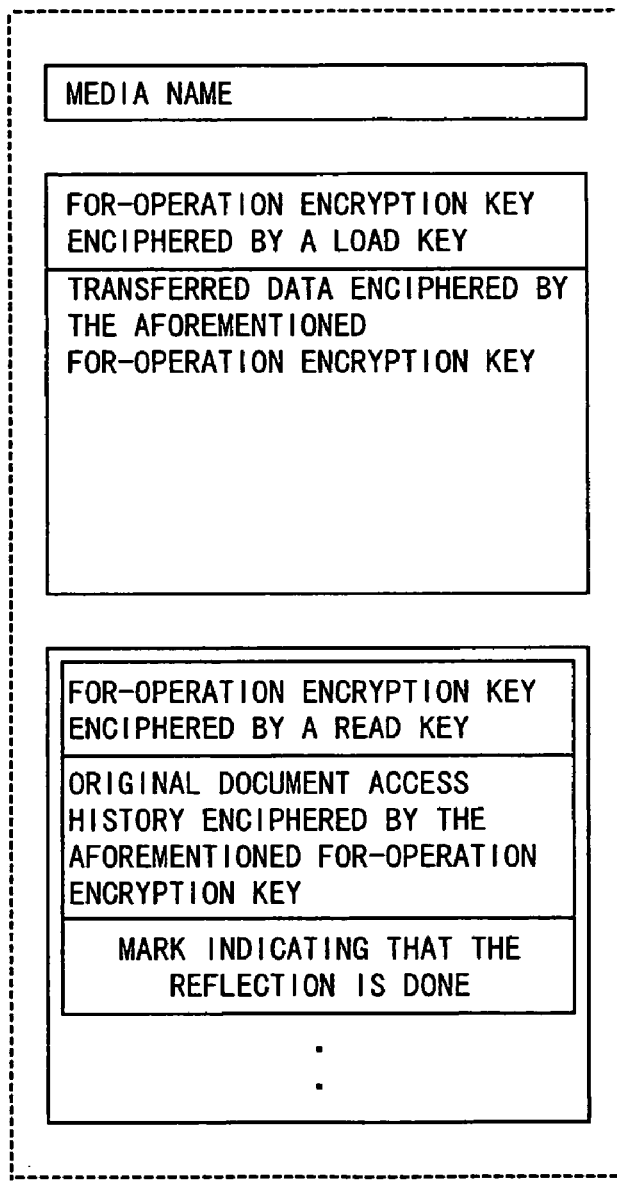
FIG. 2F describes a format of data recorded in an archive media.
Figure 3:
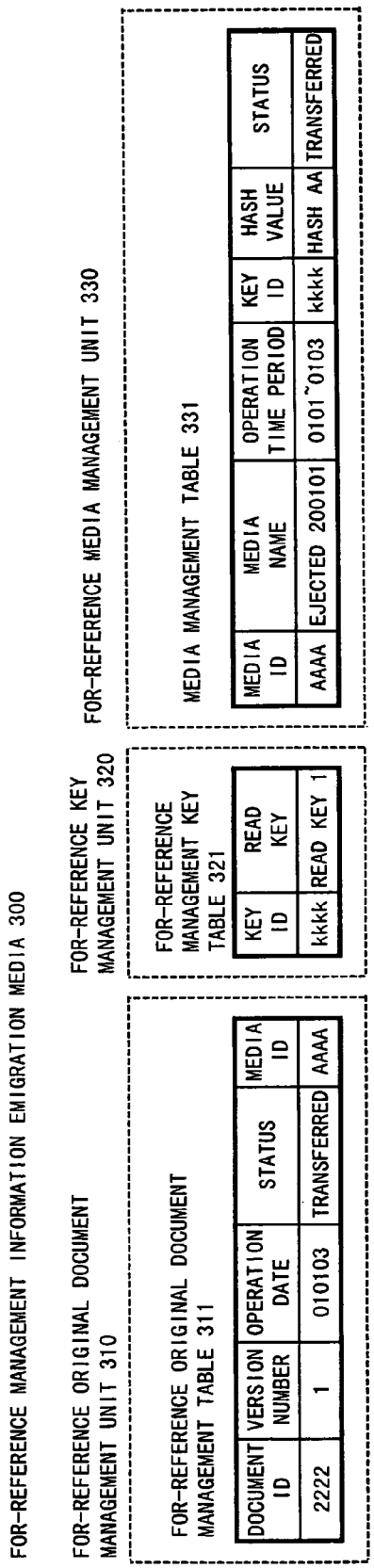
FIG. 3 describes tables comprised respectively by a for-reference original document management unit, a for-reference key management unit and a for-reference media management unit of a for-reference information emigration medium and the respective configuration.

While a detailed description of the present invention is given in the following by picking up an electronic original document as an electronic document required for a strict access management, the present invention is not limited by a storing or reference of the electronic original document, which is apparent to the inventing business entity. Note also that an "electronic original document" may be just noted as an "original document" herein.

First of all, describing the abstract of the present invention for an ease of understanding by referring to a description of the principle shown by FIG. 1, the principle of the present invention is to transfer an original document being stored for at least a specified period of time from an electronic original document storage apparatus 100 storing the original document to archive media 200; and make it possible not only to restore for a reference of the document, which has been transferred to and stored by an archive medium, back to the transferring electronic original document storage apparatus 100 but also an electronic original document reference apparatus 400 other than the aforementioned transferring electronic original document storage apparatus 100, when referring to the transferred original document. For this, the management information required for a reference is provided by the electronic original document storage apparatus 100 to the electronic original document reference apparatus 400 by way of a for-reference management information emigration media 300.

Constituting components of an embodiment according to the present invention will be described in the following while referring to the accompanying drawings FIG. 1, FIGS. 2A through 2F, FIG. 3 and FIG. 4.

As shown in FIG. 1, the electronic original document storage apparatus 100 comprises an original document access process unit 110, an original document management unit 120, an original document storage unit 130, a key management unit 140, a transfer process unit 150, an original document temporary restore unit 160, a temporary restore process unit 165, a media management unit 170, a for-reference management information extraction process unit 180 and a reference history reflection process unit 190.

The original document access process unit 110 processes an access request for an original document such as storing and acquisition based on an instruction of the requester.

The original document management unit 120 stores the status of an original document such as the registered original document being stored in the original document storage unit 130 or having been transferred to the archive media 200 and the access history relating to the original document for which the original document management unit 120 comprises an original document management table 121 containing each record having the related items, i.e., document ID, version number, operation date, status and media ID, and an original document access history table 122 having the related items, i.e., log IX, document ID, version number, operation date, operation and user ID, as shown by FIG. 2A.

The original document storage unit 130 stores the registered original document for a specified period of time. As shown by FIG. 2B, the original document storage unit 130 comprises an original document table 131 having the related items, i.e., document ID, version number, operation date and original document data. Meanwhile, it is desirable to have a capability of enciphering an original document by a method such as a common key encryption system when storing the original document and to perform a generation management by changing the encryption key at a predefined interval.

The key management unit 140 manages a load key 143 and a read key 144 used for transferring an original document to the archive media 200 and restoring it therefrom, respectively, is capable of managing the keys in a plurality of generations and comprises an encryption key creation unit 142 for creating a load key 143 and a read key 144 as a pair by using an RSA algorithm for instance. As shown by FIG. 2C, a load key 1 and a read key 1 which are created as a pair are given an identical ID kkkk and managed by a for-management key table 141. The key management unit 140 is desired to have a configuration as a hardware security module (HSM) being guarded hardware wise. In the meantime, letting it describe the load key 143 and the read key 144, both may just be related as a private key and a public key in a public key cryptosystem, having a characteristic that a data enciphered by a load key can only be decoded by using a read key and a data enciphered by a read key can only be decoded by using a load key. Needless to say, both keys must be kept secret and it is inhibited to make, for example, a load key public even though the present invention uses the public key cryptosystem. And the description of the present invention herein calls the key used when transferring an original document to the archive media 200 as a load key.

The transfer process unit 150 performs a processing of transferring an original document registered prior to a specified date from among the registered and stored by the original document storage unit 130, and also performs an enciphering and a creation of tampering detection code with help of the key management unit 140 when transferring an original document.

The original document temporary restore unit 160 stores an original document being temporarily restored from the archive media 200. As shown by FIG. 2D, the original document temporary restore unit 160 comprises a for-reference original document table 161 the same as the original document table 131 comprised by the original document storage unit 130. The reason for the original document temporary restore unit 160 comprising the for-reference original document table 161 separately from the original document storage unit 130 for storing an original document being temporarily restored is as follows. It is a routine to encipher an original document when storing it in the original document storage unit 130, and change the encryption key at a specified timing as described earlier, which means the transferred original document is enciphered by an encryption key at the time (which is different from the load key 143 and the read key 144 used for the original document stored in the archive media 200), hence an encryption key used at the time of decoding may be different from the original one. Trying to store the original document decoded by the read key 144 in the original document storage unit 130 will necessitate changing the storing encryption key to the current one, requiring a large amount of processing time. That is why comprising the original document temporary restore unit 160 for an original document being restored so as to restore the original document data as is when transferring it to the archive media 200 and to use the encryption key used at the time of transferring to the archive media 200 when taking it out of the original document temporary restore unit 160.

The temporary restore process unit 165 enables a transferred original document to be referred to by reading it out of the archive media 200 which has been created by the transfer process unit 150 and by storing the original document in the original document temporary restore unit 160. The temporary restoration will be cancelled when it will no longer be required.

The media management unit 170 stores the management information of the archive media 200 storing the transferred original documents. As shown by FIG. 2E, the media management unit 170 comprises a media management table 171 with each record having the related items. i.e., media ID, media name, operation time period, key ID, hash value and status.

The for-reference management information extraction process unit 180 collects the information required for referring to a specific original document in the electronic original document reference apparatus 400.

While not shown in the drawings, the electronic original document storage apparatus 100 comprises an input unit for inputting data such as data to specify an original document for referring thereto, to define a date for transferring an original document, et cetera; a display unit for displaying information such as an error message; and other units comprised by a common information processing apparatus. Also comprising a unit for outputting the information collected by the for-reference management information extraction process unit 180 to the for-reference management information emigration media 300 and, in addition, other appropriate unit is apparent and comprehensible to the inventing business entity of the present invention.

The archive media 200 may adopt a discretional storage medium used as an external storage medium such as a magnetic disk, a magneto optical disk and a magnetic tape. In the archive media 200, the media name is recorded as the management information; a for-operation encryption key enciphered by a load key and a transfer object data enciphered by the aforementioned for-operation encryption key with regard to the transferred original document are stored as paired pieces of information; and the later elaborated information for reflecting the history of reference done by the electronic original document reference apparatus 400 to the original document access history table 122 comprised by the electronic original document storage apparatus 100, and a mark indicating that the reflection is done in the tail part, are recorded, as shown by FIG. 2F.

Being a media for taking out information necessary for a reference, the for-reference management information emigration media 300 includes a for-reference original document management unit 310, a for-reference key management unit 320 and a for-reference media management unit 330, as shown by FIG. 1, with each unit comprising a for-reference original document management table 311, a for-reference management key table 321 and a media management table 331, respectively. The for-reference original document management table 311 stores management data, which is extracted from the original document management table 121, such as the status of the original document to be referred to by the electronic original document reference apparatus 400; the for-reference management key table 321 stores and manages a key ID and a read key both corresponding to a load key having been used when the original document, which is now the object of reference, was transferred to the archive media 200; and the media management table 331 stores the management information, which is extracted from the media management table 171, of the archive media 200 storing the original document which is now the object of reference. The for-reference management information emigration media 300 must be a media having a certain level of security such as an IC card, a security MO drive which is a portable MO drive with a built-in password function, et cetera, with password function for instance. The for-reference key management unit 320 is also desirable to comprise an HSM function the same as the key management unit 140 comprised by the electronic original document storage apparatus 100.

The electronic original document reference apparatus 400 includes an original document reference process unit 410 for performing an acquisition access to an original document based on an instruction from the requester, a for-reference original document temporary restore unit 420 for storing the original document being referred to, a for-reference restore process unit 430 for enabling the original document to be referred to by reading the original document out of the archive media 200 and storing it in the for-reference original document temporary restore unit 420 and a reference history write process unit 440 for writing a record of reference done by the electronic original document reference apparatus 400 in the archive media 200. The electronic original document reference apparatus 400, comprising an input unit and a display unit, both not shown, which are comprised by a common information processing apparatus, may be such apparatus having a capability of information exchanges with the for-reference management information emigration media 300, and of data input/output with the archive media 200 storing the original document to be referred to.

What follows next is a description of an aspect of embodiment according to the present invention by using the above described electronic original document storage apparatus 100, the for-reference management information emigration media 300 and the electronic original document reference apparatus 400 in orderly fashion.

Figure 5:
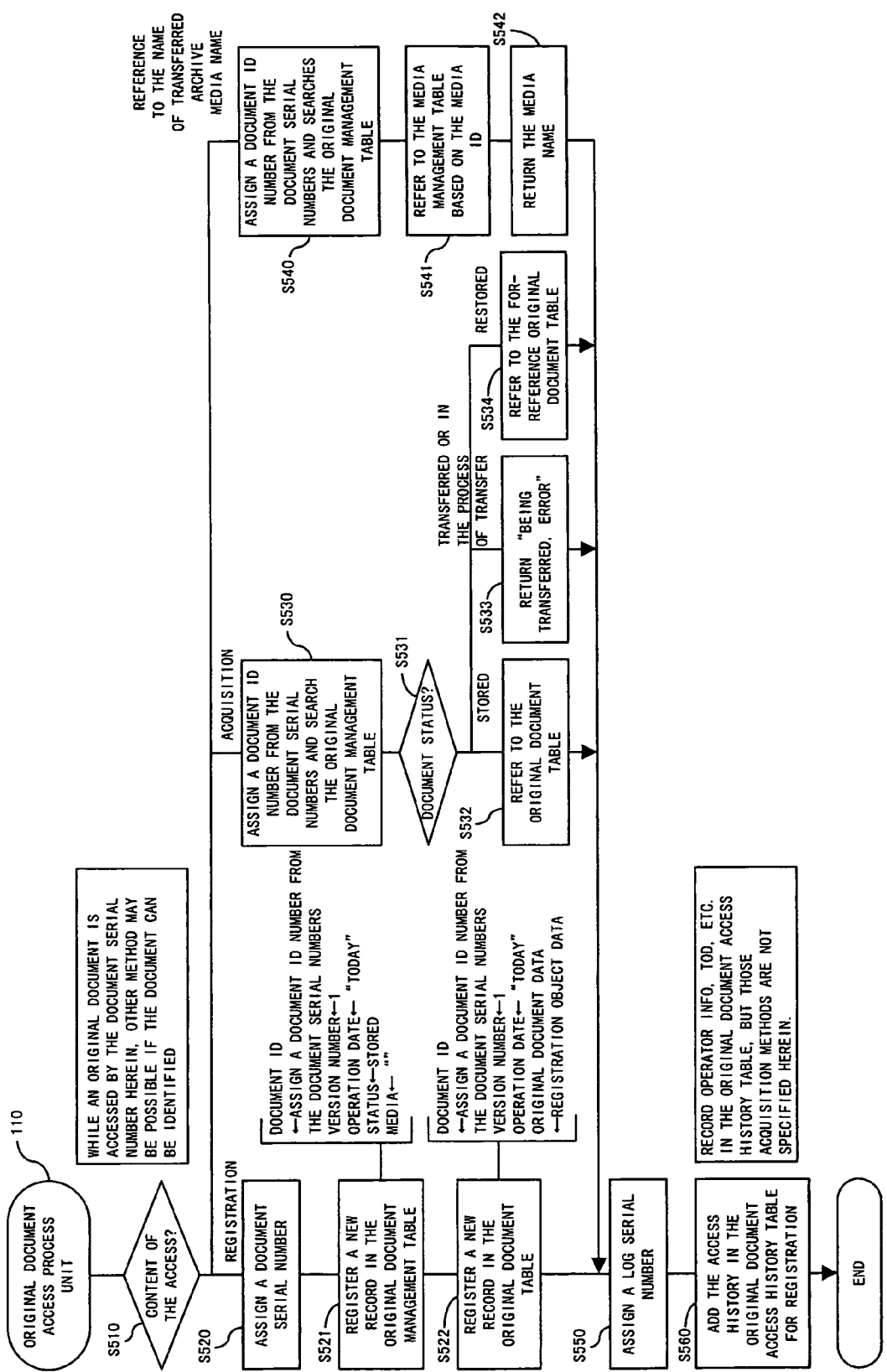
FIG. 5 describes a processing of original document access request in the electronic original document storage apparatus.

First of all, the processing for an original document access request by the electronic original document storage apparatus 100 is described by referring to FIG. 5. In the processing flow shown by FIG. 5, while an original document is accessed by the document serial number, other methods may be possible if the document can be identified. Also note that contents and kinds of access requests are not limited as shown by the drawings herein, but they can be others such as a renewal of an original document. Examples shown herein are related to the present invention only.

When an access request is made by a certain requester, the content of the access request is judged in the step S510. If the access request judged in the step S510 is a registration of an original document, it goes to the step S520 and assigns a document serial number for the registering document. Subsequently in the step S521, a new record, i.e., document ID, version number, operation date and status, is added to the original document management table 121 for registration. A document ID number assigned from the document serial number for the document ID, "1" for the version number, today's date for the operation date and "stored" for the status are respectively stored; whereas no record is entered for the media ID. Then proceeding to the step S522, new record, i.e., document ID, version number, operation date and original document data, are added to the original document table 131 as an additional registration. The same data as the original document management table 121 are stored for the document ID, version number and operation date, and original document data of the original as the object of registration is stored for the original document data.

If the access request judged in the step S510 is an acquisition, proceeding to the step S530, assigns a document ID number from the document serial number, searches the original document management table 121 based on the assigned document ID number and refers to the status of the original document being requested for acquisition. Then in the step S531, judges the referred status. If the status is "stored", proceeding to the step S532, returns the original document data being requested for acquisition to the requester by referring to the original document table 131. If the status is either "transferred" or "being transferred", then returns information about "being transferred, error" back to the requester. If the status is "restored", returns the original document data being requested for acquisition back to the requester by referring to the for-reference original document table 161.

If the access request judged in the step S510 is a reference to the name of transferred archive media name, proceeding to the step S540, assigns a document ID number from the document serial number, searches the original document management table 121 based on the assigned document ID number and acquires the media ID for the archive media storing the original of the applicable document serial number. Then in the step S541, refers to the media management table 171 based on the acquired media ID, followed by returning the media name back to the requester in the step S542.

An access request for a transferred media is further described here. A user requesting acquisition of an original document usually has no idea about a presence or absence of the original document in the electronic original document storage apparatus at the time of the request. Therefore, if the requested document is either in the transferred status or in the process of transfer, a "being transferred, error" is returned in the step S533, and there is a need to place an access request for a transferred media name reference by inputting the document serial number as an attempt to acquire the archive media 200 storing the transferred original document in order to decide if the document shall be temporarily restored or it can be referred to in the electronic original document reference apparatus 400.

When finishing the processing for each access request, proceeding to the step S550, assigns a log serial number and adds the access history in the original document access history table 122 for registration and ends as the processing by the original document access process unit 110.

Figure 6:
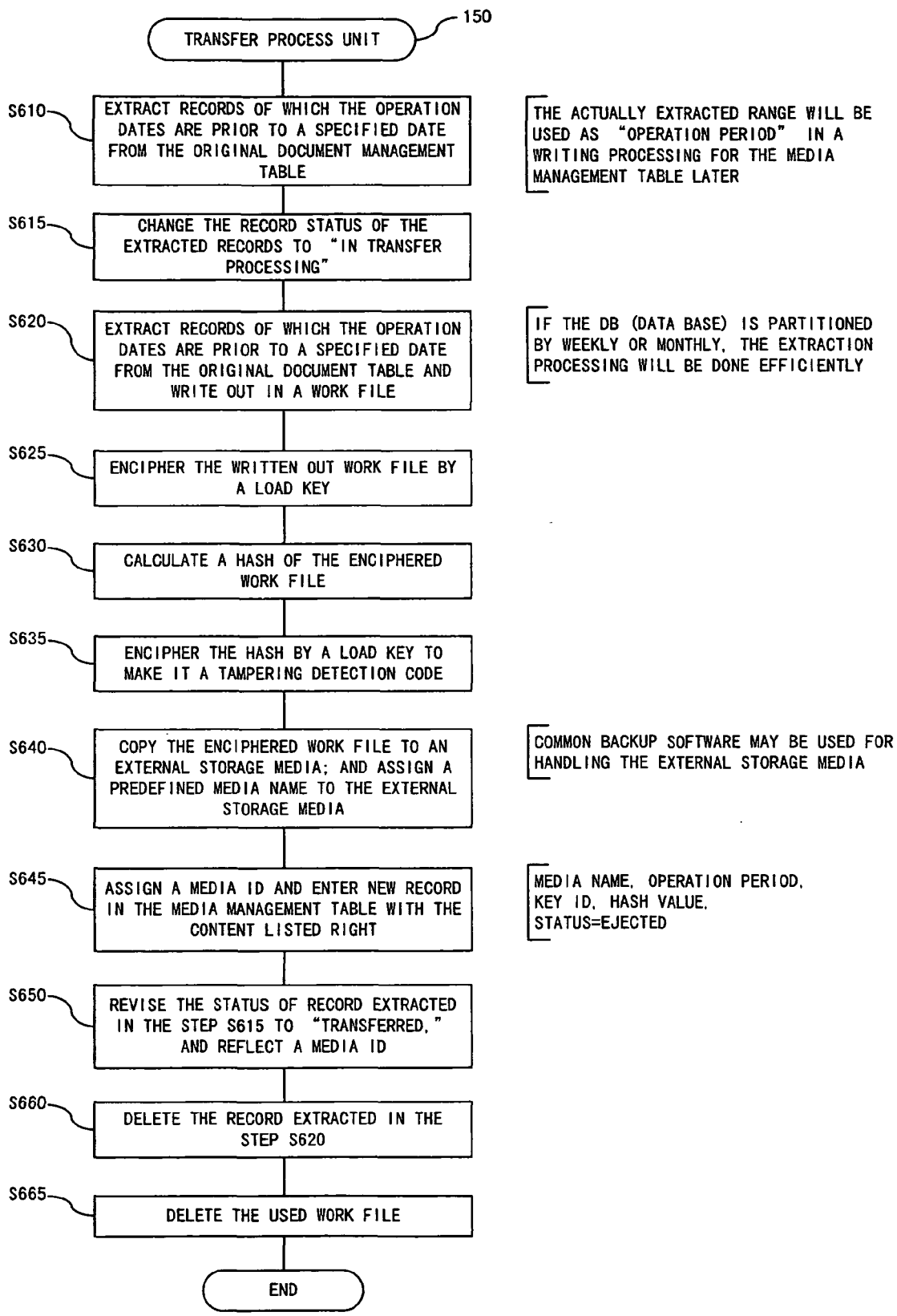
FIG. 6 describes a transfer processing in the electronic original document storage apparatus.

Next up is a description of a processing of the transfer process unit 150 for transferring an original automatically while referring to FIG. 6. In the beginning step S610, accesses the original document management table 121 and extracts records of which the operation dates are prior to a specified date. In the next step S615, changes the record status of the extracted records to "in transfer processing." In the next step S620, extracts records of which the operation dates are prior to a specified date from the original document table 131 and writes them out in a work file. If the original document table is partitioned by weekly or monthly according to the operation date, the extraction processing will be done efficiently. A reversible data compression may be done when writing out in a work file. Then in the step S625, enciphers the written out work file by a load key with help from the key management unit 140.

Figure 13B:
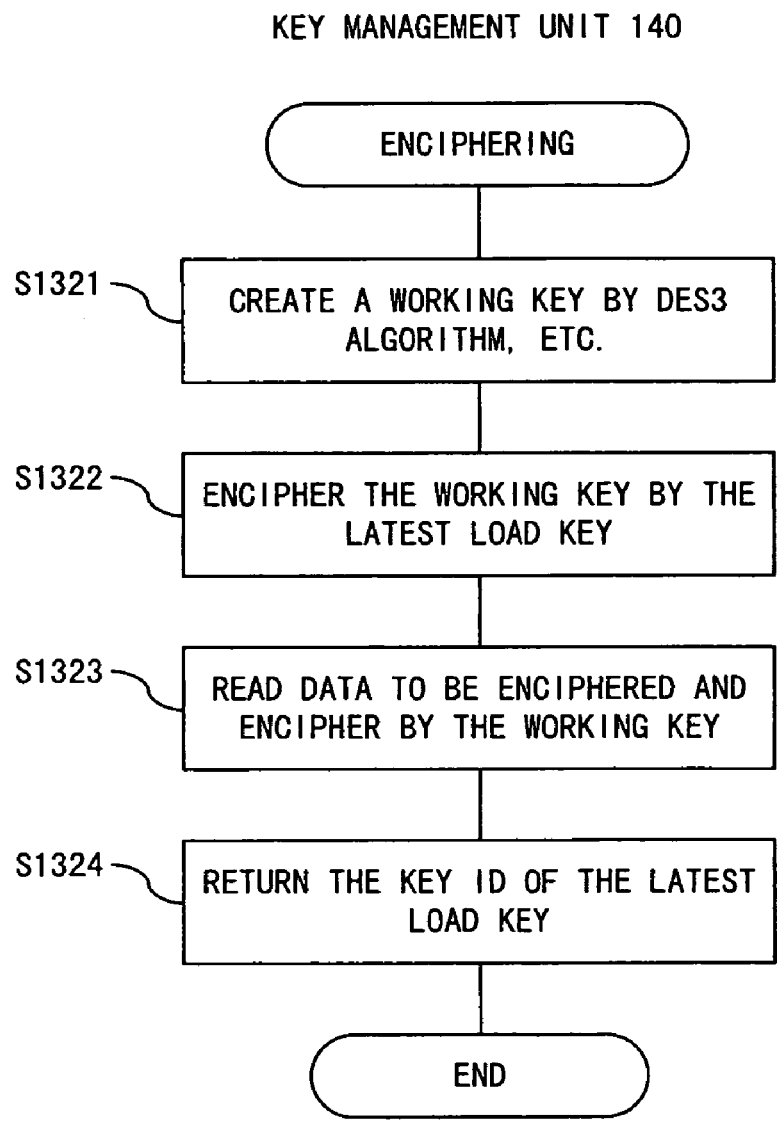
FIG. 13B describes an encryption by load key in the key management unit.

In the key management unit 140, creates a key pair by using the RSA algorithm, et cetera, in advance in the step S1311 and assigns a key ID and store in the for-management key table 141 in the step S1312 as shown by FIG. 13A. Keys of a plurality of generations are being managed by the for-management key table 141. Receiving a request for encryption, first creates a working key by using a DES3 algorithm, et cetera, in the step S1321, as shown by FIG. 13B. Then in the step S1322, enciphers the working key by using the latest load key being managed by the for-management key table 141. Then in the step S1323, reads the data to be enciphered, that is, the work file being written out with the data for transfer, since the current processing is the step S625 of the transfer process unit 150 as the requester, and enciphers it by using the working key which has been enciphered in the previous step S1322. Then, in the step S1324, returns the key ID of the most recently used load key and finishes the encryption processing. Note that the reason why the load key enciphers the working key and the working key enciphered by the load key enciphers the working file, instead of the load key enciphering the working file, is for reducing the enciphering processing load while maintaining the security and that "encipher by the load key" means not only enciphering directly by the load key but also enciphering a working key of the common key cryptography by a load key and then enciphering by the enciphered working key in the description of the specification and the drawings of the present invention.

Figure 13C:
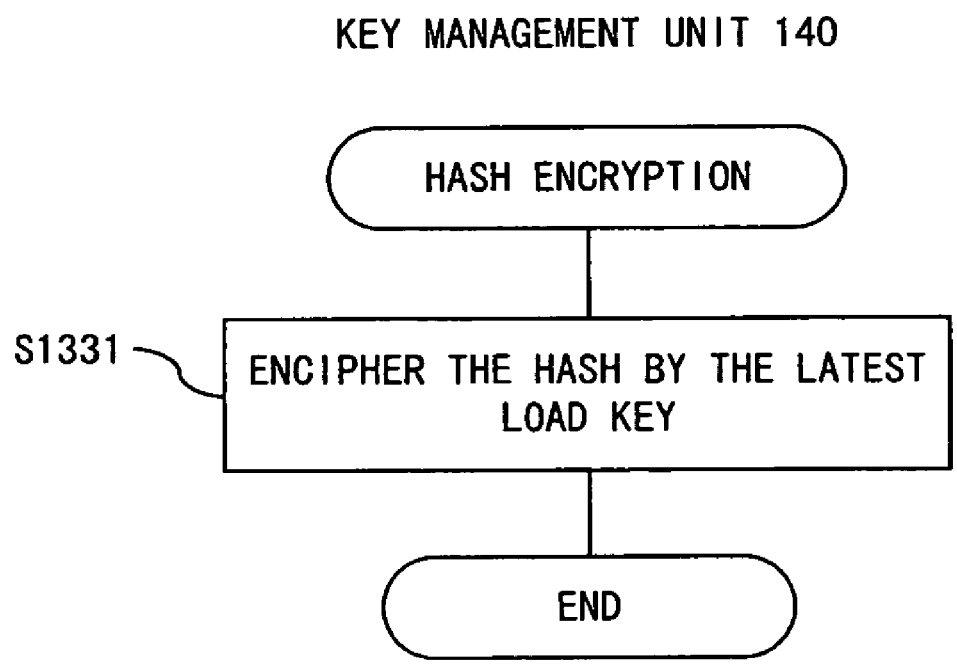
FIG. 13C describes a encryption of a hash in the key management unit.

Now the transfer process unit 150 proceeds to the step S630, and calculates a hash of the work file which has been enciphered in the step S625. Then, in the step S635, requests the key management unit 140 for enciphering the hash by a load key to make it a tampering detection code. Over at the key management unit 140, enciphers the hash by using the latest load key in the step S1331 shown by FIG. 13C.

The transfer process unit 150, proceeding to the next step S640, copies the enciphered work file to an external storage media by using a common backup software, et cetera, assigning a predefined media name to the external storage media. Then in the step S645, assigns a media ID number and enters new record items, i.e., media ID, media name, operation period, key ID, hash value and records "transferred" in the status column of the media management table 171 for registration. The media ID is the assigned ID number; and the media name is the specified. The operation period is between the operation date of the extracted record in the step S610 and the date of transfer. The key ID is the one returned by the key management unit 140 in the step S625; and the hash value is the one calculated in the step S630 and then enciphered in the step S635.

Then it revises the status of record extracted in the step S615 to "transferred" in the original document table and reflects a media ID of the media management table to the media ID in the step S650. Then in the step S660, deletes the record extracted in the step S620, and in the step S665, deletes the used work file and ends the transfer processing.

Figure 13D:
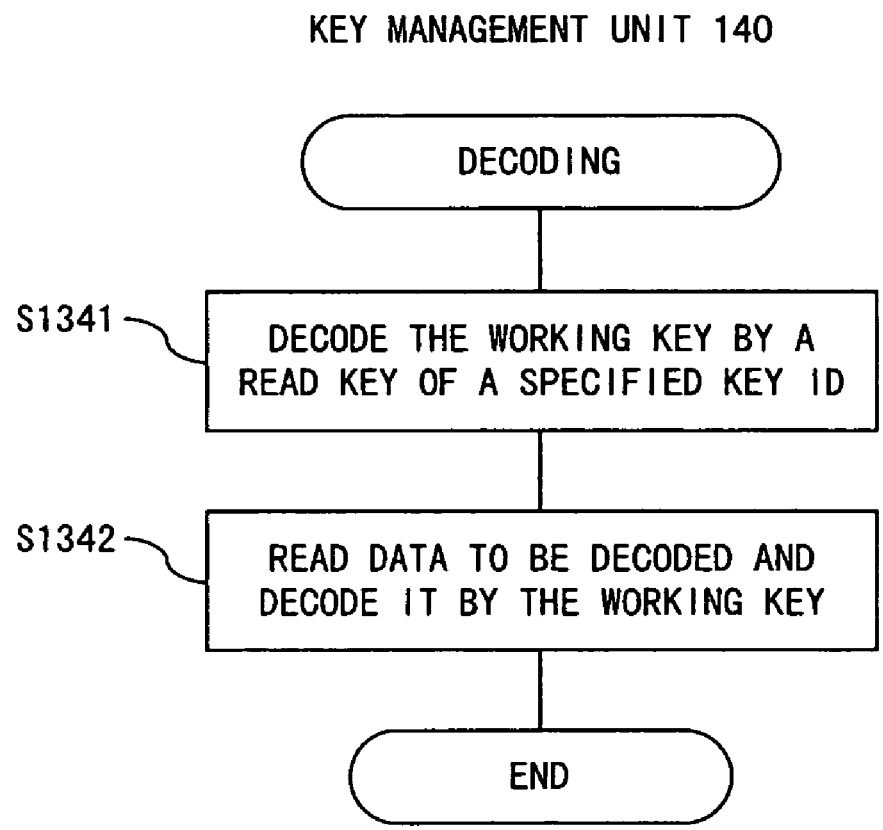
FIG. 13D describes a decoding by read key in the key management unit.
Figure 13E:
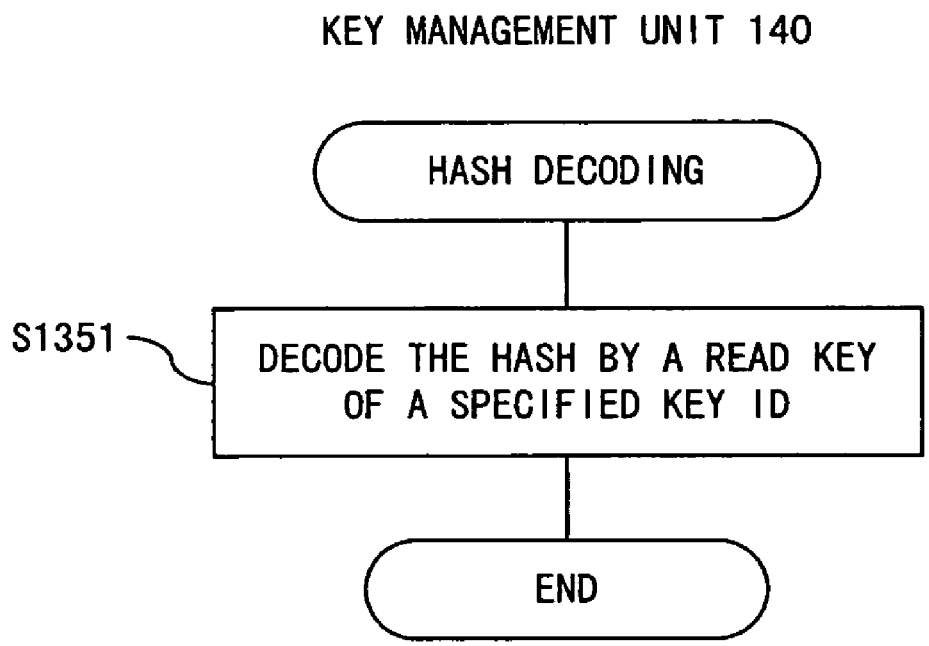
FIG. 13E describes a decoding of a hash in the key management unit.

Now a description will be given to the processing by the temporary restore process unit 165 for temporarily restoring an original document transferred to the archive media 200 on the electronic original document storage apparatus 100 to make the original document to be referred to by referring to FIG. 7. First in the step S710, obtains the media name of the external storage media as an object of temporary restoration, and in the step S720, judges whether or not the obtained media name is existent in the media management table 171 and the status is "transferred" for making certain that the media is the object of a temporary restoration. If the judgment is "no", then it branches to S799, returns a message notifying of a "wrong media", then proceeding to the step S770, deletes the used work file and ends the processing. If the judgment is "yes" on the other hand, proceeding to the step S730, copies a file contained in the archive media 200, which is the external storage media as an object of temporary restoration, in a work file. As understood by the description about the archive media shown by FIG. 2F, the work file contains at least a working key enciphered by a load key and data as the object of transfer enciphered by the working key. Then in the step S731, calculates a hash of the work file to be decoded. Then in the step S732, searches the media management table 171 by using the media name, and acquires the key ID and the hash value. Then in the step S733, requests the key management unit 140 for decoding the hash value by specifying the hash value and key ID being acquired from the media management table 171, thus decoding the hash value. Over at the key management unit 140, the specified hash value is decoded by using a read key of the specified key ID in the step S1351 as shown by FIG. 13E. Then in the step S740, judges whether or not the decoded hash in the step S733 is identical with the calculated hash in the step S731. If not identical, meaning it has been tampered with, branches to the step S799, returns a message meaning as such and, proceeding to the step S770, deletes the used work file, thus ending the processing.

If both of the hash values are identical, meaning no tampering with, proceeds to the step S750 and requests the key management unit 140 for decoding the work file, which is a file having been copied out of the external storage media in the step S731, by specifying the key ID acquired from the media management table 171, thus decoding the work file. Over at the key management unit 140, the working key copied in the work file is decoded by using the read key of the specified key ID in the step S1341, and the data as the object of transfer contained in the work file, which is the data to be decoded, is decoded by using the decoded working key in the step S1342, as shown by FIG. 13D.

Then in the step S760, the temporary restore process unit 165 takes a record group out of the decoded work file and stores it in the for-reference original document table 161, and in addition, changes the status of the respective records to "restored" in the original document management table 121 based on the document ID. Through this, the original document transferred to the archive media 200 has become temporarily restored to be referred to on an electronic original document storage apparatus. Proceeding to the step S770 at last, deletes the used work file and ends the temporary restoration processing.

Next up is a description of processing for restoring an original document from the archive media 200 for a reference on the electronic original document reference apparatus 400.

Figure 13F:
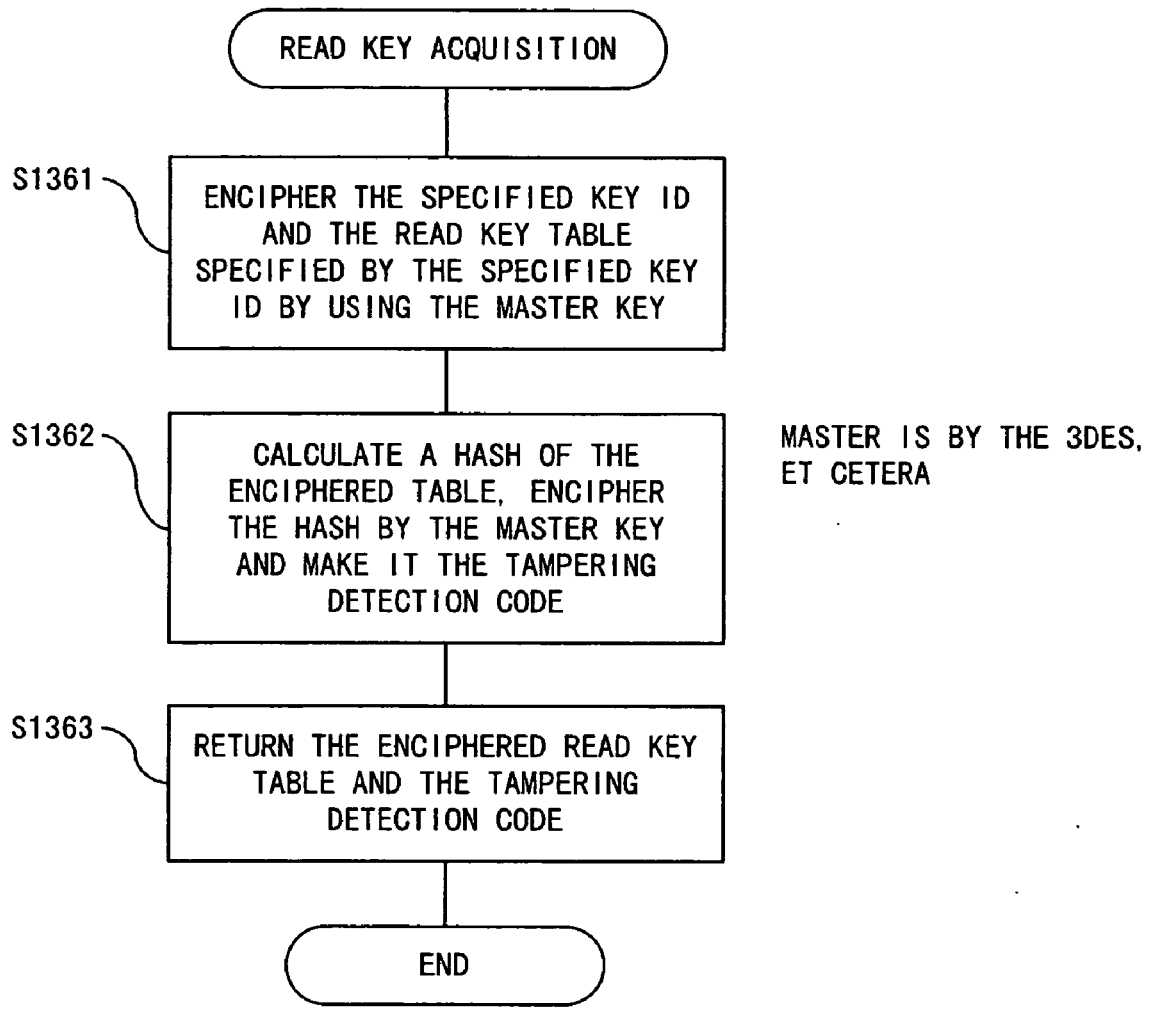
FIG. 13F describes an acquisition of read key in the key management unit.

First of all, as the electronic original document storage apparatus 100 receives a request for referring to an original document transferred to an archive media on another apparatus, the for-reference management information extraction process unit 180 is called up. The for-reference management information extraction process unit 180, in the step S810, assigns a document ID number based on the document serial number, for instance, contained in the reference request and thereby refers to the item "status" in the original document management table 121. In the step S820, judges whether or not the status is "transferred", and, if it is not "transferred", proceeds to the step S890, returns an error message meaning that the document being requested for a reference is not yet archived and ends the processing. If the status is "transferred", proceeding to the step S830, searches the original document management table 121 by using the document ID number assigned in the step S810 as the key and stores the extracted record in the for-reference management information emigration media 300 as a for-reference original document management table 311 comprised by the for-reference original document management unit 310. Then in the step S840, searches the original document access history table 122 by using the document ID number as the key like in the step S830 and stores the extracted record in the for-reference original document management unit 310. Then in the step S850, searches the media management table 171 by using the media ID containing the record extracted in the step S830 as the key and stores the extracted record in the for-reference management information emigration media 300 as a for-reference original document management table 311 comprised by the for-reference media management unit 330. In the subsequent step S860, takes a read key table and a tampering detection code out of the key management unit 140 by specifying the key ID being contained by the record in the media management table 171 extracted in the step S850 and stores in a for-reference emigration media as data for the for-reference key management unit 320. Over at the key management unit 140, having received a request for acquiring a read key in the step S860, enciphers the specified key ID and the read key table defined by the specified key ID by using the master key in the step S1361 as shown by FIG. 13F. Note that the master key is a key per the 3DES, et cetera, which is unique identifier for a system. The reason for enciphering by the master key is that the read key will be taken out to the outside of the electronic original document storage apparatus 100, requiring an enhancement of the security. It is not mandatory, however, if the security is adequately maintained in the for-reference management information emigration media 300. Then in the step S1362, calculates a hash of the table enciphered by the master key, enciphers the hash by the master key and make it the tampering detection code. Then in the following step S1363, returns the enciphered read key table and the tampering detection code to the step S860 in the for-reference management information extraction process unit 180, thus ending the processing.

Through the above described processing in the for-reference management information extraction process unit 180, the information necessary for a reference is stored in the for-reference management information emigration media 300 so that the user can connect the aforementioned media 300 with the electronic original document reference apparatus 400, set the archive media 200 and refer to a transferred original document. The access history is recorded in the archive media 200 followed by being reflected to the original document access history table 122 comprised by the electronic original document storage apparatus 100.

Now a detailed description will be given for an original document reference processing by the electronic original document reference apparatus 400 while referring to FIGS. 9 through 11 as follows.

Figure 9:
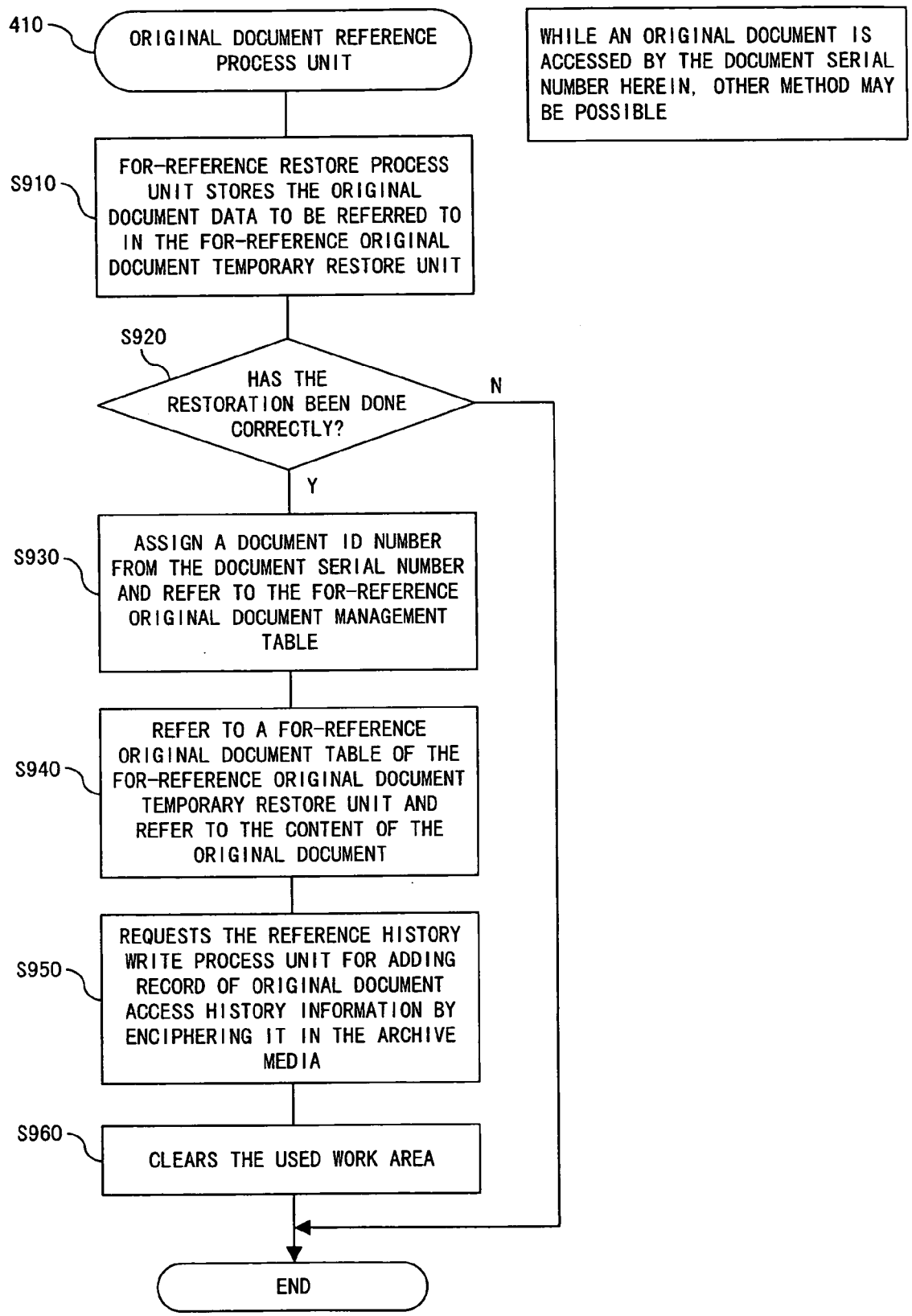
FIG. 9 describes processing of restoring an original document from an archive media, referring to it and writing a reference history in the archive media in the electronic original document reference apparatus.

As the electronic original document reference apparatus 400 receives an access request for acquiring an original document from the archive media 200, the original document reference process unit 410 calls out the for-reference restore process unit 430 and stores the original document data to be referred to in the for-reference original document temporary restore unit 420 in the beginning step S910 as shown by FIG. 9.

Figure 7:
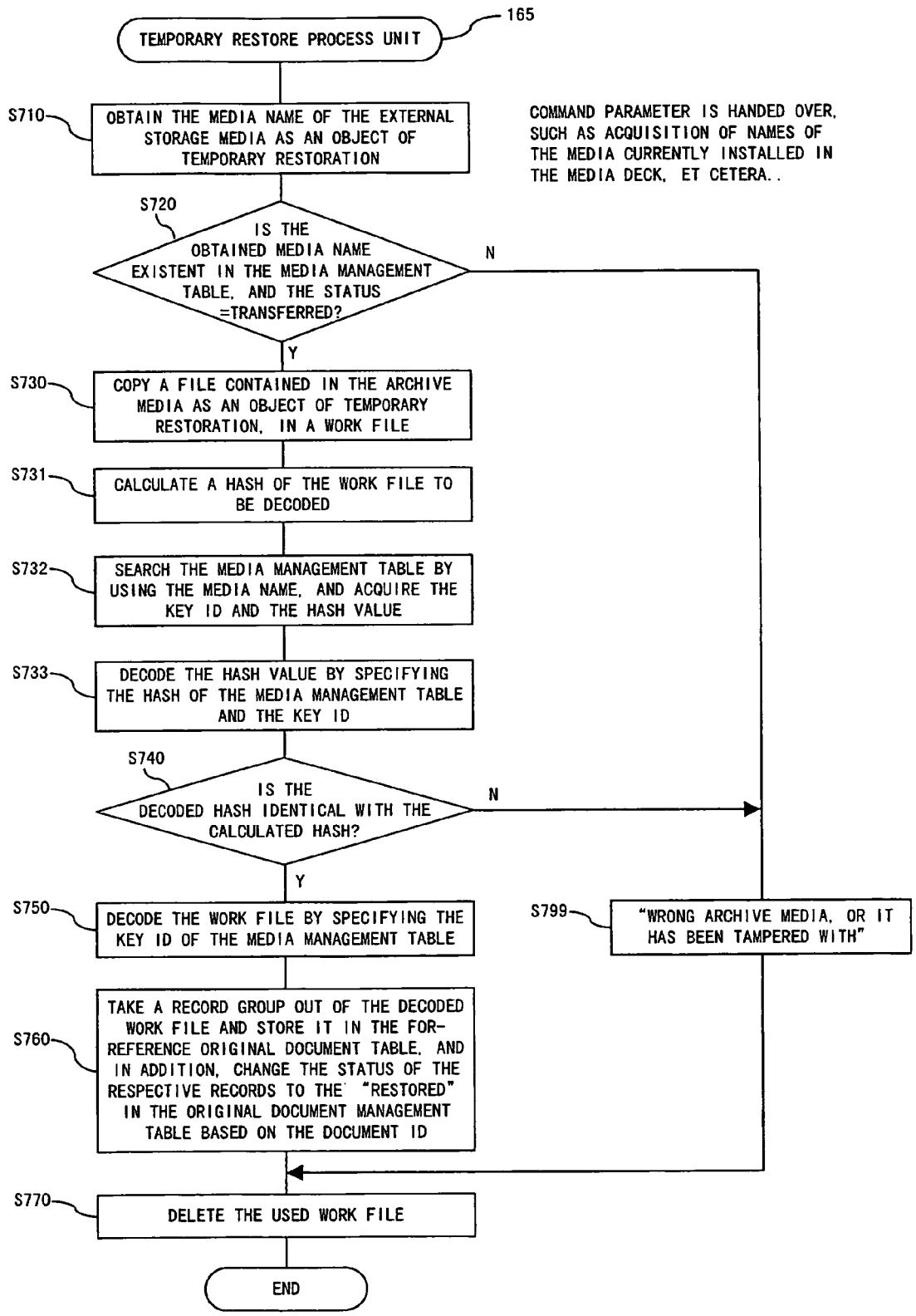
FIG. 7 describes a restoration processing of temporarily transferred original document in the electronic original document storage apparatus.
Figure 8:
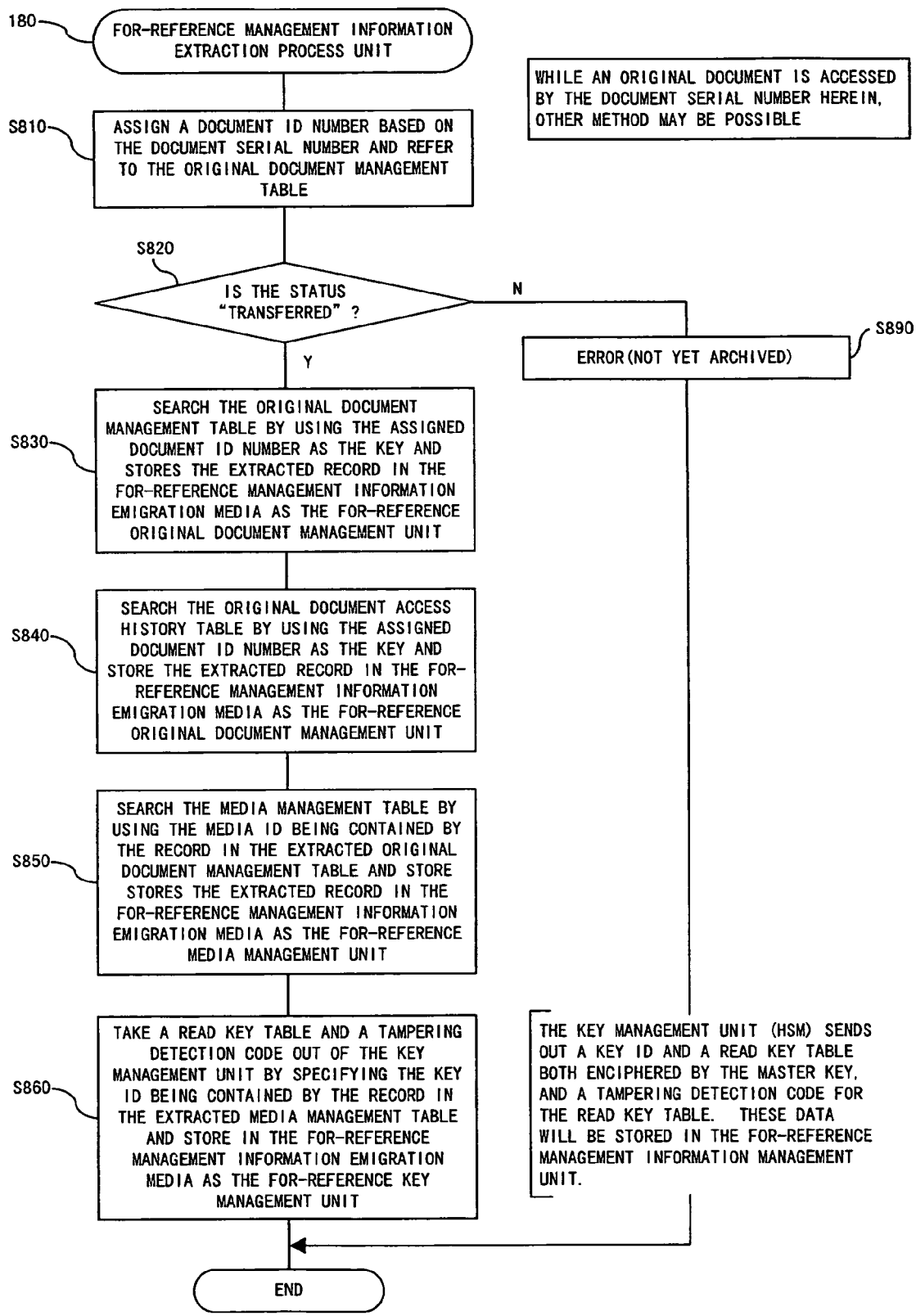
FIG. 8 describes an information extraction processing required for an electronic original document reference apparatus referring to an original document from an archive media in the electronic original document storage apparatus.
Figure 10:
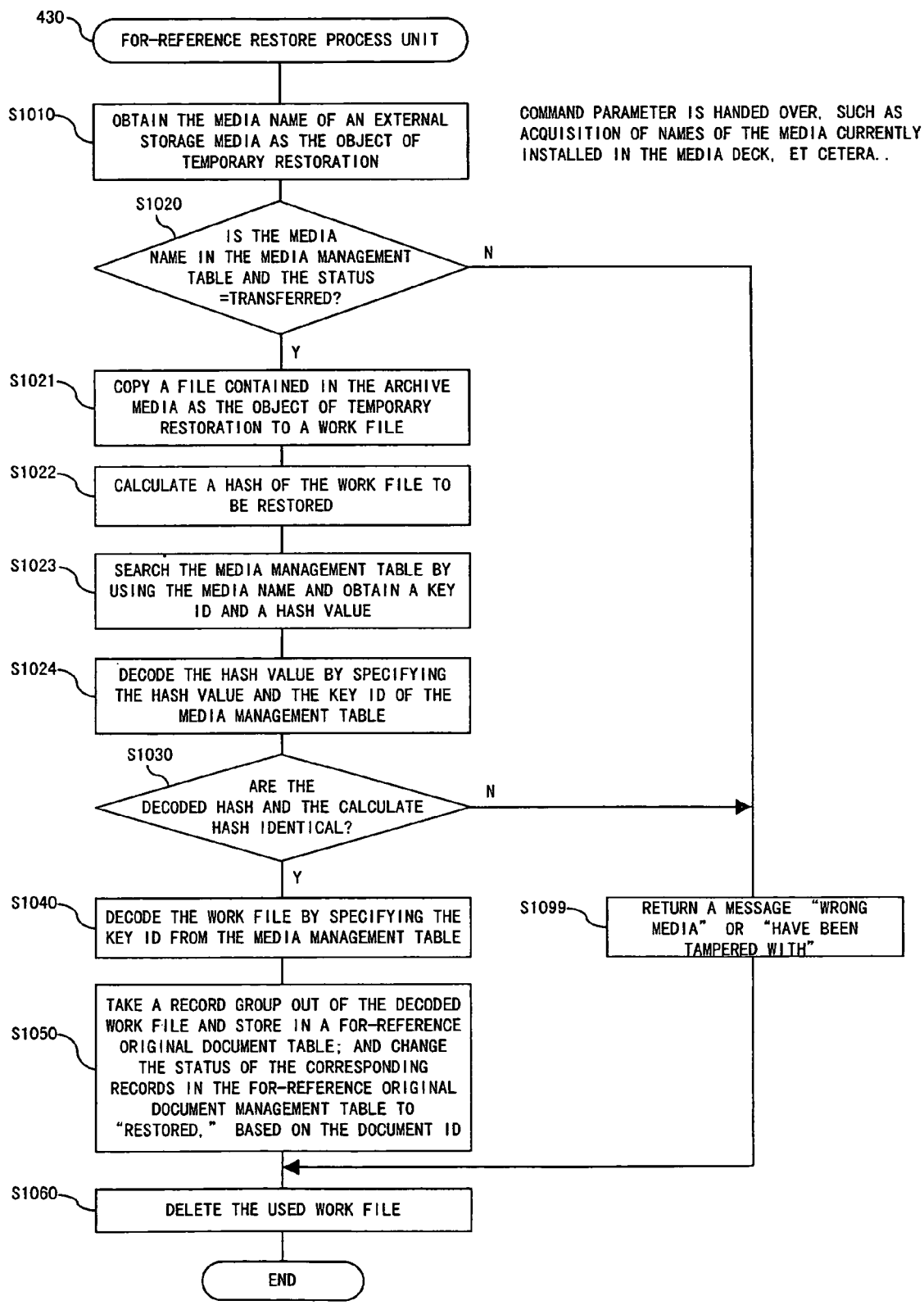
FIG. 10 describes processing of the electronic original document reference apparatus restoring an original document.

The processing in the for-reference restore process unit 430 being initiated by the original document reference process unit 410 as shown by FIG. 10 is approximately the same as the processing in the temporary restore process unit 165 comprised by the electronic original document storage apparatus 100 shown by FIG. 7. The respective processings are performed in those steps.

Figure 14B:
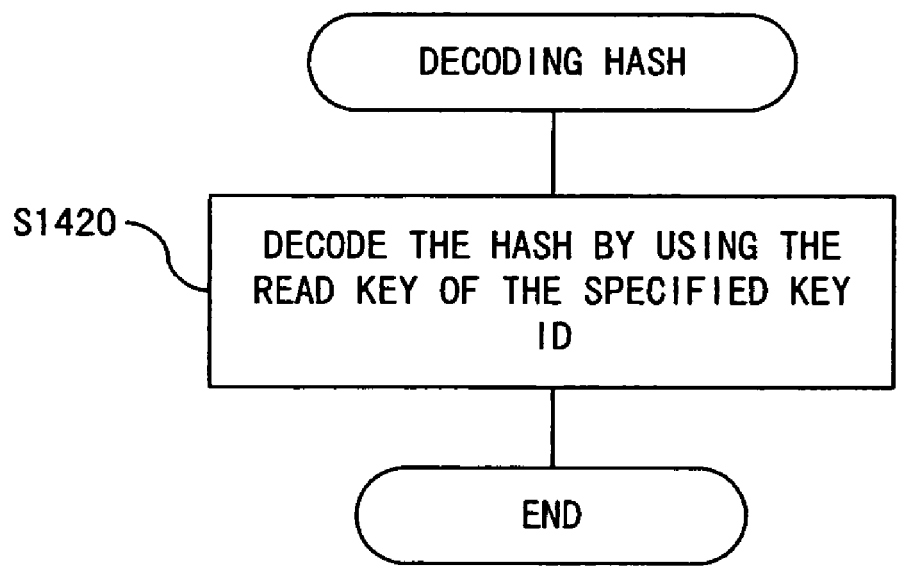
FIG. 14B describes a decoding of a hash by read key in the for-reference key management unit.

First in the step S1010, obtains the media name of an external storage media as the object of temporary restoration and in the step S1020, checks the storage media set as the object of temporary restoration by judging as to whether or not the obtained media name is existent in the media management table 331 comprised by the for-reference media management unit 330 and the status is "transferred". If the judgment result is "no", branches to the step S1099, returns a message meaning "wrong media", and, proceeding to the step S1060, deletes the used file to end the processing. If the judgment result is "yes", proceeds to the step S1021 and copies a file contained in the archive media 200, which is the external storage media as the object of temporary restoration, to a work file. As understood by the description about the archive media shown by FIG. 2F, the work file contains at least a working encryption key enciphered by a read key and a transferred data enciphered by the working encryption key. Then in the step S1022, calculates a hash of the work file to be restored. Subsequently in the step S1023, searches the media management table 331 by using the media name and obtains a key ID and a hash value. In the following step S1024, requests the for-reference key management unit 320 for decoding the hash value by specifying the key ID and the hash value both obtained from the media management table 331, thus decoding the hash value. Over at the for-reference key management unit 320, the specified hash value is decoded by using the read key of the specified key ID in the step S1420 as shown by FIG. 14B. In the next step S1030, the for-reference restore process unit 430 judges whether or not the decoded hash in the step S1024 and the one calculated in the step S1022 are identical. If they are not identical, meaning there has been a tampering, branches into the step S1099, returns a message notifying as such, and, proceeding to the step S1060, deletes the used file to end the processing.

If both of the hash values are identical, meaning there has been no tampering, proceeds to the step S1040 in which requests the for-reference key management unit 320 for decoding the work file copied from the external storage media in the step S1021 by specifying the key ID obtained from the media management table 331. Over at the for-reference key management unit 320, the working key copied in the work file is first decoded by the read key of the specified key ID in the step S1410 as shown by FIG. 14A. Then the transferred data in the work file as the object of decoding is decoded by the decoded working key in the next step S1411.

Figure 14C:
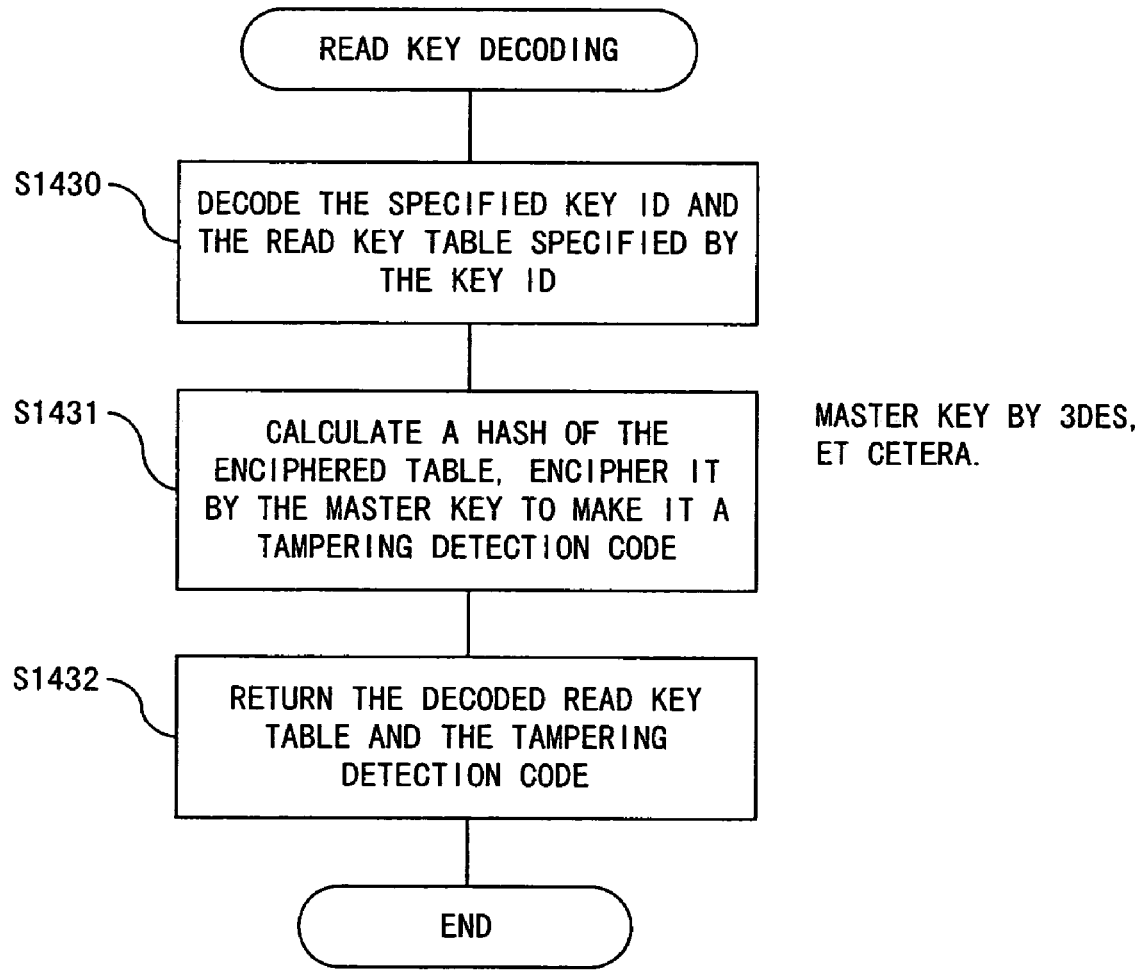
FIG. 14C describes a decoding of a read key in the for-reference key management unit.

If the read key was enciphered by the master key when for-reference management information was extracted, it is necessary to decode the read key in the for-reference key management unit 320 before decoding the hash value and the working key above mentioned. In that case, the for-reference key management unit 320 decodes the specified key ID and the key table defined by the specified key ID by using the master key in the step S1430 as shown by FIG. 14C. Also, in the step S1431, calculates a hash of the table enciphered by the master key, enciphers the hash key by the master key and makes it the tampering detection code. Then in the following step S1432, returns the decoded read key table and the tampering detection code. In the subsequent step S1050, the for-reference restore process unit 430 takes a record group out of the decoded work file and stores it in a for-reference original document table 421, and in addition changes the status of the corresponding records in the for-reference original document management table 311 to "restored," based on the document ID. This makes the original document transferred to the archive media 200 now restored temporarily for reference on the electronic original document reference apparatus 400. Then proceeds to the step S1060, deletes the used work file, ends the for-reference restoration processing and return a processing to the original document reference process unit 410.

In the step S920, the original document reference process unit 410 judges whether or not the restoration by the for-reference restore process unit 430 has been done correctly and, if it has not been done correctly, branches into the step S960, clears the work area and ends the processing. If it has been done correctly, proceeds to the step S930, assigns a document ID number from the document serial number and refers to the for-reference original document management table 311. Then in the step S940, refers to a for-reference original document table 421 comprised by the for-reference original document temporary restore unit 420 and refers to the content of the original document. Then in the step S950, calls up the reference history write process unit 440 and adds a record of original document access history information by enciphering it in the archive media 200.

Figure 11:
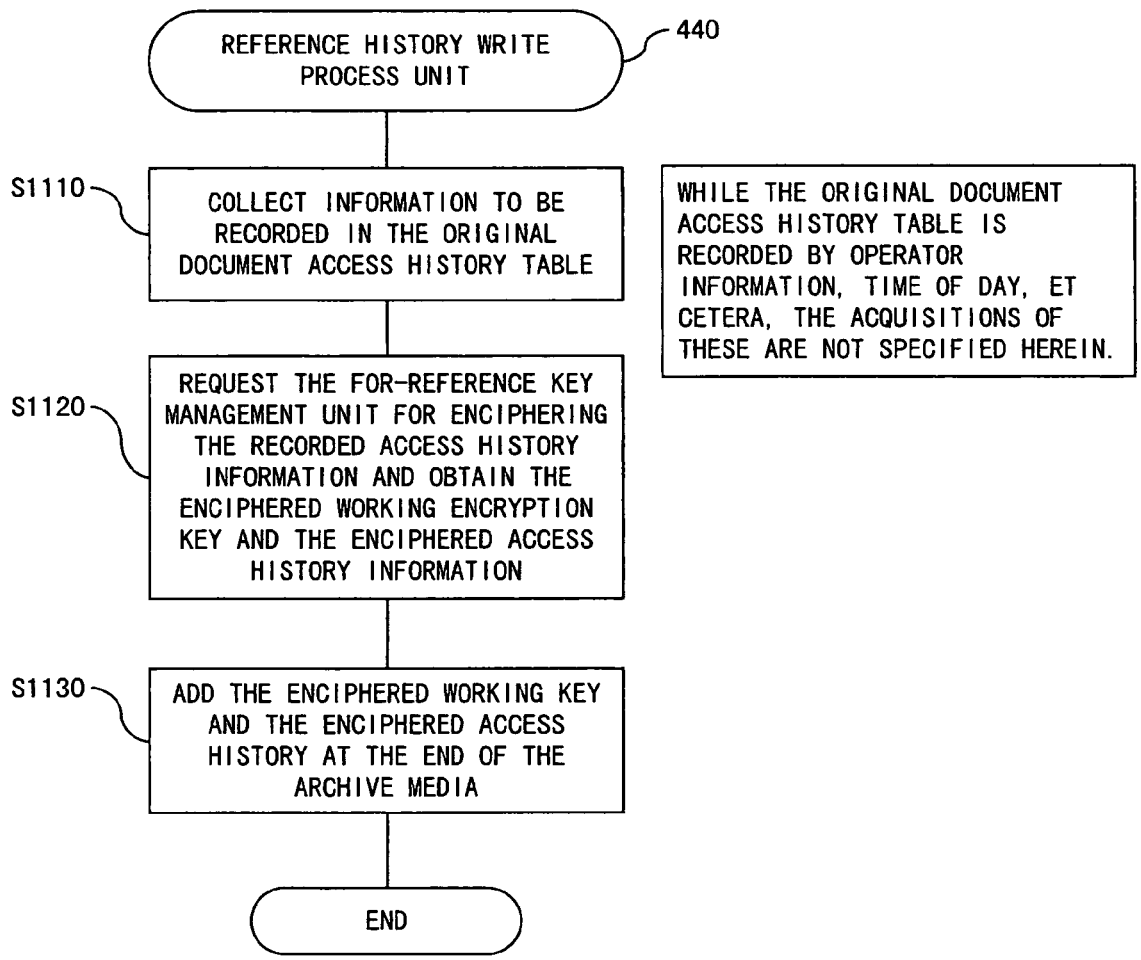
FIG. 11 describes processing of the electronic original document reference apparatus writing a reference history in an archive media.

The reference history write process unit 440 first collects and records information to be recorded in the original document access history table comprised by the for-reference management information emigration media 300 in the step S1110 as shown by FIG. 11. Then in the step S1120, requests the for-reference key management unit 320 for enciphering the recorded access history information by specifying the key ID of the read key having been used for decoding the referred original document, and thus obtaining the enciphered working encryption key and the enciphered access history information.

Figure 14D:
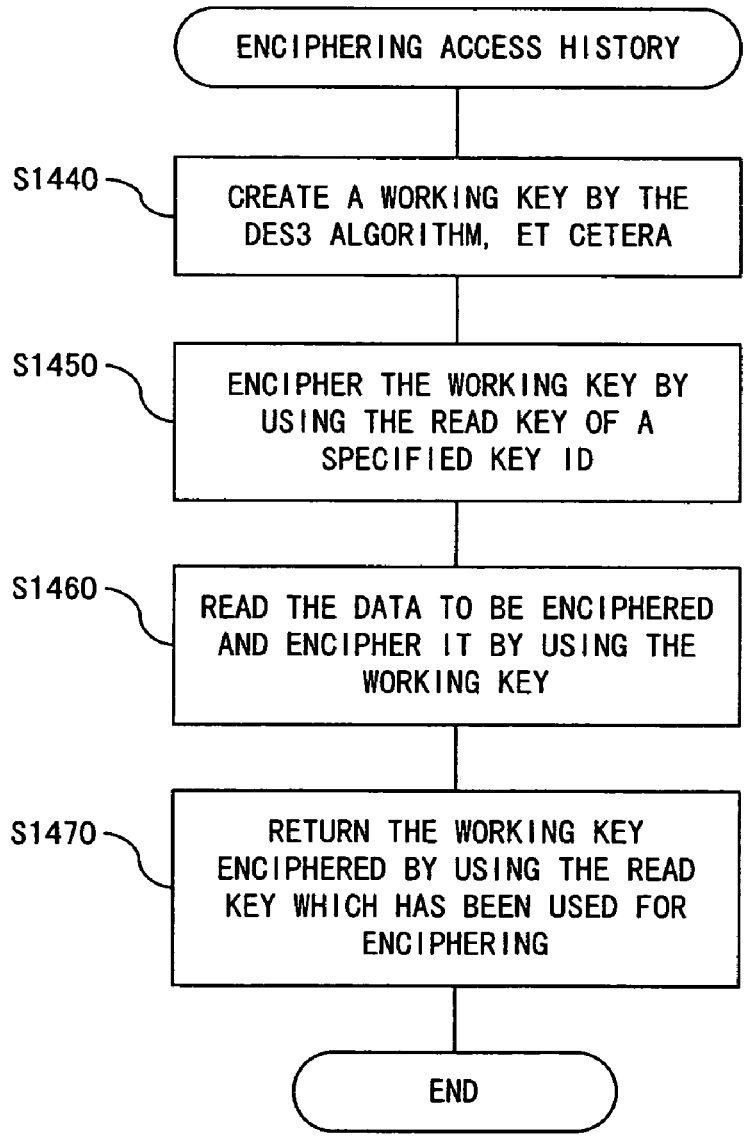
FIG. 14D describes an encryption of a reference history in the for-reference key management unit.

Having received the request, the for-reference key management unit 320 first creates a working key by the DES3 algorithm, et cetera, in the step S1440 as shown by FIG. 14D. Then in the step S1450, enciphers the working key by using the read key of a specified key ID. Then in the step S1460, reads the access history information as the object data of enciphering and enciphers it by the enciphered working key in the previous step. And in the step S1470, returns the working key enciphered by using the read key which has been used for enciphering the access history information, thus ending the processing.

The reference history write process unit 440 adds the enciphered working key and the enciphered access history returned from the for-reference key management unit 320 in the step S1130 at the end of the archive media 200, finishing the reference history write processing, and returns the processing control to the original document reference process unit 410.

The original document reference process unit 410 clears the work area used in the step S960 and finishes the original document reference processing.

Note that while the management information for an original document reference remains stored in the for-reference management information emigration media 300 when it is accessed to on the electronic original document reference apparatus 400 in the above described original document reference processing, the practice is not limited as such and either a part or the whole of the information may be first copied onto an electronic original document reference apparatus for performing an original document reference processing, which is easily comprehensible to the inventing business entity.

Figure 12:
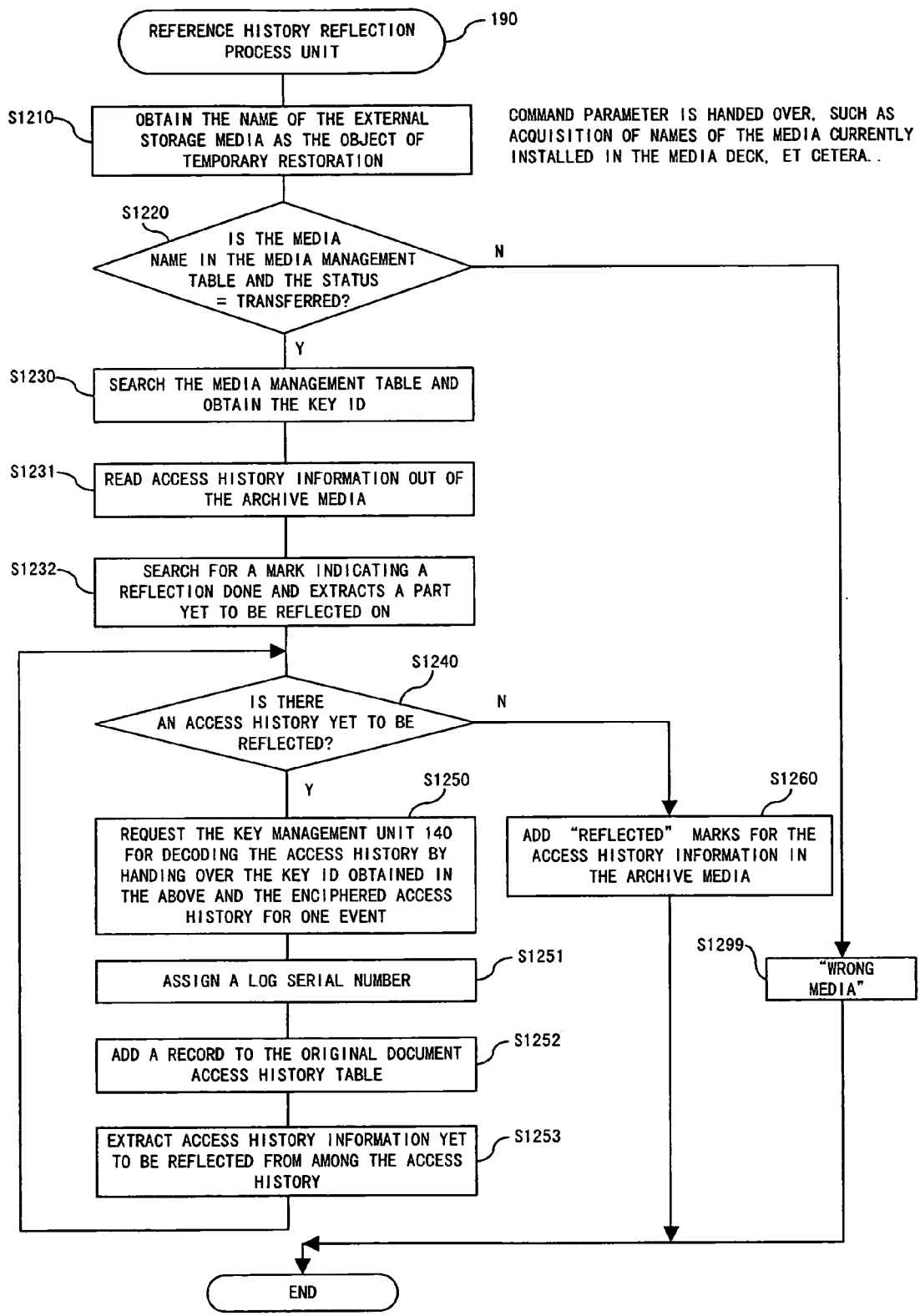
FIG. 12 describes processing of reflecting a reference history of the electronic original document reference apparatus in the electronic original document storage apparatus.

Next description is about the processing for reflecting a reference history recorded at the end of the archive media 200 to the original document access history table 122 comprised by the electronic original document storage apparatus 100. The processing is for reflecting access information recorded in the archive media 200 to the original document access history table 122 in an appropriate timing such as auditing an original document reference history by the electronic original document storage apparatus 100. The following is a detailed description about such processing done by the reference history reflection process unit 190 according to FIG. 12.

Figure 14E:
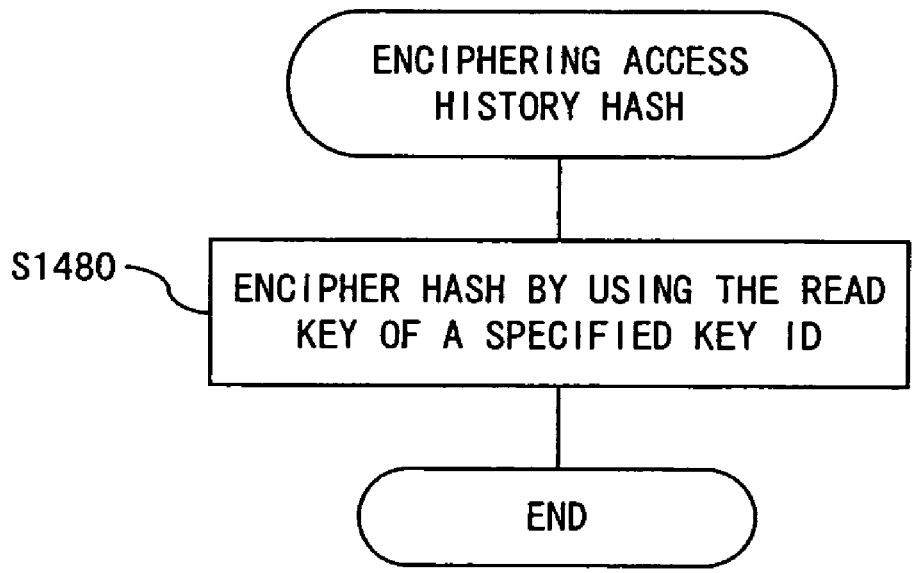
FIG. 14E describes an encryption of a hash of a reference history in the for-reference key management unit.

First of all, it obtains the name of the external storage media (i.e., archive media 200) as the object of reflection processing in the step S1210, and judges whether or not the obtained media name is existent in the media management table 171 and the status is "transferred" in the step S1220 for checking the storage media set as the object of reflection processing. If the judgment result is "no", branching into the step S1299, returns a message "wrong media" and ends the processing. If the judgment result is "yes", then proceeding to the step S1230, searches the media management table 171 by using the media name obtained in the step S1210 as the key to obtain a key ID. Then in the step S1231, it reads access history information out of the archive media 200. Then in the step S1232, it searches for a mark indicating a reflection done and extracts a part yet to be reflected to. Then in the step S1240, refers to the original document access history table 122, and judges whether or not a "yet to be reflected" access history in the original document access history table 122 is among the ones extracted in the step S1232. If there is no "yet to be reflected", then proceeding to the step S1260, adds "reflected" marks for the access history information in the archive media 200 and ends the processing. If there is, on the other hand, proceeding to the step S1250, it requests the key management unit 140 for decoding the access history by handing over the key ID obtained in the step S1230 and the enciphered access history for one event. Over at the key management unit 140, the working key is decoded by using the load key of the specified key ID in the step S1371, the access history as the object of decoding is read out in the step S1372 and decoded by using the working key decoded already in the step S1371, as shown by FIG. 13G. Next, the reference history reflection process unit 190 assigns a log serial number in the step S1251 and adds to the record along with the decoded access history information for the original document access history table 122 in the step S1252. Then, extracts access history information yet to be reflected from among the access history stored in the archive media 200 in the step S1253 and goes back to the step S1240 for repeating the above described processings. It goes without saying that the processing will end when the access history yet to be reflected no longer exists in the step S1253, while it is not shown in the drawing for simplicity. Meanwhile, although a detection of tampering with the reference history has not been mentioned in the description of the reference history processing on the above described electronic original document reference apparatus 400, it is apparent to the inventing business entity that such a detection of presence or absence of tampering is possible in a reference history reflection processing shown by FIG. 12 by calculating the hash of an access history in the reference history write processing shown by FIG. 11 and the for-reference key management unit 320 making a tampering detection code by enciphering the hash by the read key of the specified key ID in the step S1480 shown by FIG. 14E.

In summary the present invention, as understood by the detailed description thereof, accomplishes the following functions of:

1) having electronic document data for the document itself and the management data separately;

2) transferring the electronic document automatically to an external storage media in a specific period of time after the registration thereof;

3) enciphering by a load key at the time of the transfer for preventing an information leakage; and returning a message "transferred" at a reference request if the document has been transferred based on the management data;

4) reading in the main apparatus when requiring a reference of the transferred electronic document, and decoding temporarily by using a read key for enabling a reference;

5) enabling a reference without restoring to the main storage apparatus by providing the read key and the management information to an apparatus used for a reference;

6) adding the access history by the apparatus used for a reference to the applicable external storage media by enciphering the access history by a read key;

7) making it possible to audit the access history for the external storage media by decoding the access history by using a load key on the main storage apparatus;

8) securing the security of the load and read keys by using a key pair according to the RSA, et cetera; and 9) maintaining the security of moving the for-reference management information to an apparatus for a reference by using an IC card, et cetera.

What is claimed is:

1. An electronic document storage apparatus for storing an electronic document, comprising:

an electronic document storage unit for storing a registered electronic document for a specified period of time;

an electronic document management unit for storing at least a status, a date of registration and an access history of the registered electronic document;
a transfer process unit for transferring to an archive media an electronic document registered prior to a defined date from among electronic documents stored in the electronic document storage unit by referring to information stored in the electronic document management unit; and
a key management unit decodes reference history information encoded by an electronic document reference apparatus and stored in the archive media, by using a write key paired with a read key used for encoding the reference history information, where the reference history information indicates reference to the electronic document, and
wherein the transfer process unit calculates a hash value of the electronic document, and after encoding the calculated hash value using the write key used when the key management unit encodes the electronic document, stores the encoded hash value in the archive media,
the electronic document reference apparatus calculates a hash value of the electronic document stored in the archive media, and decodes the electronic document stored in the archive media using the read key stored in a for-reference management information emigration media when the calculated hash value matches a hash value obtained by decoding the hash value stored in the archive media using the read key stored in the for-reference management information emigration media,
the write key and the read key are configured to be changed at a specified timing, and
the electronic document reference apparatus decodes the electronic document stored in the archive media by using the read key paired with the write key used when the electronic document was transferred by the transfer process unit.

2. The electronic document storage apparatus according to claim 1, further comprising a temporary restoration process unit for reading said electronic document transferred by said transfer process unit out of said archive media into an electronic document temporary restoration unit; and
an electronic document temporary restoration unit for storing an electronic document read out of the archive media by the temporary restoration process unit.

3. The electronic document storage apparatus according to claim 2, wherein an electronic document stored in said electronic document storage unit is enciphered at the time of registration of the electronic document by using an encryption key being renewed at an appropriate timing and being under a generation management;
said transfer process unit transfers an electronic document enciphered by an encryption key being used at the time of registration to said archive media; and
said temporary restoration process unit reads out the transferred electronic document remaining as being enciphered by an encryption key used at the time of registration into said electronic document temporary restoration unit.

4. The electronic document storage apparatus according to claim 1, wherein the key management unit, includes:
an encryption key creation unit for creating a pair of keys made up of encryption keys by a public key encryption system, and
a for-management key table for managing the pair of keys being created by the encryption key creation unit through assigning key ID as a load key for one of the pair of keys and a read key for the other thereof, for enciphering by using the load key when there is a request for enciphering,
wherein said transfer process unit requests the key management unit for enciphering an electronic document as the object of transfer followed by transferring the aforementioned electronic document to an archive media.

5. An electronic document storage and reference system, comprising:
an electronic document storage apparatus including an electronic document storage unit for storing a registered electronic document for a specified period of time;
an electronic document management unit for storing at least a status, a date of registration and an access history of the registered electronic document;
a key management unit including an encryption key creation part for creating a pair of keys made up of encryption keys based on a public key encryption system and a for-management key table for managing the pair of keys created by the encryption key creation part through assigning key ID as a load key for one of the pair of keys and a read key for the other thereof, and for enciphering by using the load key when there is a request for enciphering, a media management table for recording management information of an archive media being used for transferring the electronic document; and
a transfer process unit for transferring to an archive media an electronic document registered prior to a defined date from among the electronic documents stored in the electronic document storage unit following a request to the key management unit for enciphering the electronic document and for storing management information of an archive media used for transfer including the key ID of a used encryption key in the media management table; and
an electronic document reference apparatus for restoring the electronic document transferred into the archive media, the electronic document reference apparatus including a for-reference information emigration media, and
wherein the electronic document storage apparatus includes:
a for-reference management information extraction unit for extracting information including a key ID of an encryption key used at a time of transferring the electronic document required for referring thereto by searching the electronic document management unit and the media management table, receiving a load key used for enciphering and the pairing read key by requesting the key management unit for enciphering the aforementioned extracted information by specifying the key ID, and storing the enciphered extracted information and the received read key in a for-reference information emigration media when the electronic document storage apparatus receives a request for referring to an electronic document transferred to the archive media on the electronic document reference apparatus, and
the for-reference information emigration media includes a for-reference key management unit for managing the read key,
wherein the electronic document reference apparatus, when receiving a request from the requester for acquiring the electronic document stored in the archive media, reads the electronic document based on information stored in the for-reference management information emigration media, requests the for-reference key management unit for decoding the read electronic document to enable access to the electronic document, and the write key and the read key are configured to be changed at a specified timing, and the electronic document reference apparatus decodes the electronic document stored in the archive media by using the read key paired with the write key used when the electronic document was transferred by the transfer process unit.

6. The electronic document storage and reference system according to claim 5, wherein said electronic document reference apparatus further comprises a reference history write processing unit for making reference history information, requesting said for-reference key management unit for enciphering the aforementioned reference history information by using said read key and writing the enciphered reference history information in said archive media, and said electronic document storage apparatus further comprises a reference history reflection process unit for reflecting reference history information written in the archive media to said electronic document management unit.

7. An electronic document transfer method by using an electronic document storage apparatus comprising an electronic document storage unit for storing a registered electronic document for a specified period of time, and an electronic document management unit for storing at least a status, a date of registration and an access history of the registered electronic document, comprising:

registering and storing an electronic document in the electronic document storage unit, and storing at least a status and the date of registration for the electronic document in the electronic document management unit;

defining a date of extracting the electronic document for transfer;

extracting the electronic document prior to a defined date by referring to the date of registration for storing in the electronic document management unit in the registering; and transferring an electronic document extracted to an archive media; and decoding reference history information encoded by an electronic document reference apparatus and stored in the archive media, by using a write key paired with a read key used for encoding the reference history information, where the reference history information indicates reference to the electronic document, and wherein a hash value of the electronic document is calculated, and after encoding the calculated hash value using the write key, the encoded hash value is stored in the archive media, a hash value of the electronic document is calculated and stored in the archive media, and the electronic document stored in the archive media is decoded using the read key stored in a for-reference management information emigration media when the calculated hash value matches a hash value obtained by decoding the hash value stored in the archive media using the read key stored in the for-reference management information emigration media, and the write key and the read key are configured to be changed at a specified timing, and the electronic document reference apparatus decodes the electronic document stored in the archive media by using the read key paired with the write key used when the electronic document was transferred.

8. A non-transitory computer readable medium for storing a program, in a program for making a computer operate as an electronic document storage apparatus comprising an electronic document storage unit for storing a registered electronic document for a specified period of time, and an electronic document management unit for storing at least a status, a date of registration and an access history of the registered electronic document, for making the electronic document storage apparatus perform an operation comprising:

registering and storing an electronic document in the electronic document storage unit, and storing at least a status and the date of registration for the electronic document in the electronic document management unit;

defining a date of extracting the electronic document for transfer;

extracting the electronic document prior to a defined date by referring to the date of registration for storing in the electronic document management unit in the registering; and transferring an electronic document extracted to an archive media; and decoding reference history information encoded by an electronic document reference apparatus and stored in the archive media, by using a write key paired with a read key used for encoding the reference history information, where the reference history information indicates reference to the electronic document, and wherein a hash value of the electronic document is calculated, and after encoding the calculated hash value using the write key, the encoded hash value is stored in the archive media, a hash value of the electronic document is calculated and stored in the archive media, and the electronic document stored in the archive media is decoded using the read key stored in a for-reference management information emigration media when the calculated hash value matches a hash value obtained by decoding the hash value stored in the archive media using the read key stored in the for-reference management information emigration media, and the write key and the read key are configured to be changed at a specified timing, and the electronic document reference apparatus decodes the electronic document stored in the archive media by using the read key paired with the write key used when the electronic document was transferred.

9. A non-transitory computer-readable recording medium having stored therein a program causing a computer operate as an electronic document reference apparatus and execute an operation, comprising:

referring to an electronic document transferred to an archive media from an electronic document storage apparatus for storing the electronic document;

accessing the archive media based on for-reference management information provided by the electronic document storage apparatus; and reading the electronic document out of the archive media; and decoding reference history information encoded by an electronic document reference apparatus and stored in the archive media, by using a write key paired with a read key used for encoding the reference history information, where the reference history information indicates reference to the electronic document, and wherein a hash value of the electronic document is calculated, and after encoding the calculated hash value using the write key, the encoded hash value is stored in the archive media, a hash value of the electronic document is calculated and stored in the archive media, and the electronic document stored in the archive media is decoded using the read key stored in a for-reference management information emigration media when the calculated hash value matches a hash value obtained by decoding the hash value stored in the archive media using the read key stored in the for-reference management information emigration media, and the write key and the read key are configured to be changed at a specified timing, and the electronic document reference apparatus decodes the electronic document stored in the archive media by using the read key paired with the write key used when the electronic document was transferred by the electronic document storage apparatus.

10. An electronic document storage apparatus for storing an electronic document, comprising:

an electronic document storage unit for storing the registered electronic document for a specified period of time;

an electronic document management unit for storing at least a status, a date of registration and an access history of the registered electronic document;

a key management unit, including an encryption key creation part for creating a pair of keys made up of encryption keys by a public key encryption system and a for-management key table for managing the pair of keys created by the encryption key creation part through assigning key ID as a load key for one of the pair of keys and a read key for the other thereof, for enciphering by using the load key when there is a request for enciphering;

a media management table for recording management information of an archive media being used for transferring the electronic document;

a transfer process unit for transferring to an archive media an electronic document registered prior to a defined date from among the electronic documents registered in the electronic document storage unit following a request to the key management unit for enciphering the electronic document and storing management information of an archive media used for transfer including the key ID of a used encryption key in the media management table;

a for-reference management information extraction unit, when receiving a request for referring to an electronic document transferred to the archive media on an apparatus other than the electronic document storage apparatus, for extracting information including a key ID of an encryption key used at the time of transferring the electronic document required for referring thereto by searching the electronic document management unit and the media management table;

a key management unit decodes reference history information encoded by an electronic document reference apparatus and stored in the archive media, by using a write key paired with a read key used for encoding the reference history information, where the reference history information indicates reference to the electronic document, and wherein a hash value of the electronic document is calculated, and after encoding the calculated hash value using the write key used when the key management unit encodes the electronic document, the encoded hash value is stored in the archive media, and the electronic document reference apparatus calculates a hash value of the electronic document stored in the archive media, and decodes the electronic document stored in the archive media using the read key stored in a for-reference management information emigration media when the calculated hash value matches a hash value obtained by decoding the hash value stored in the archive media using the read key stored in the for-reference management information emigration media, and the write key and the read key are configured to be changed at a specified timing, and the electronic document reference apparatus decodes the electronic document stored in the archive media by using the read key paired with the write key used when the electronic document was transferred by the transfer process unit.

11. The electronic document storage apparatus according to claim 10, wherein said for-reference management information extraction unit receives a load key used for enciphering and the pairing read key by requesting said key management unit for enciphering said extracted information by specifying said key ID, and stores the enciphered extracted information and the received read key in said for-reference information emigration media for emigrating to an apparatus other than the electronic document storage apparatus.

* * * * *